US008441898B2

(12) United States Patent
Holzapfel et al.

(10) Patent No.: US 8,441,898 B2
(45) Date of Patent: May 14, 2013

(54) METHOD AND DEVICES FOR COPY PROTECTION, COPY PROTECTED RECORD CARRIER

(75) Inventors: Klaus Holzapfel, Kuchl (AT); Andreas Winter, Viehhausen (AT); Markus Spitzlinger, Elsbethen (AT); Kenjiro Ueda, Tokyo (JP)

(73) Assignees: SONY Corporation, Tokyo (JP); SONY DADC Corporation, Tokyo (JP); SONY DADC Austria AG, Anif (AT)

( * ) Notice: Subject to any disclaimer, the term of this patent is extended or adjusted under 35 U.S.C. 154(b) by 0 days.

(21) Appl. No.: 13/371,952

(22) Filed: Feb. 13, 2012

(65) Prior Publication Data
US 2012/0250473 A1  Oct. 4, 2012

(30) Foreign Application Priority Data

Mar. 31, 2011  (EP) .................................... 11002699

(51) Int. Cl.
*G11B 21/08* (2006.01)
(52) U.S. Cl.
USPC .................. 369/30.69; 369/47.12; 369/275.3; 386/252; 386/259
(58) Field of Classification Search ............... 369/30.09, 369/30.08, 47.12, 30.03, 53.2, 59.12, 59.29, 369/30.11, 275.1, 275.3; 386/252, 260, 259, 386/94; 726/29; 380/201; 713/189
See application file for complete search history.

(56) References Cited

U.S. PATENT DOCUMENTS

| 6,987,718 | B2 | 1/2006 | Winter et al. |
| 7,532,558 | B2 | 5/2009 | Reiter et al. |
| 7,609,944 | B2 * | 10/2009 | Basile ........................... 386/252 |
| 7,680,023 | B2 | 3/2010 | Blaukovitsch et al. |
| 7,702,215 | B2 * | 4/2010 | Green ........................... 386/241 |
| 7,773,495 | B2 | 8/2010 | Meerwald et al. |
| 8,000,179 | B2 | 8/2011 | Spitzlinger et al. |

(Continued)

FOREIGN PATENT DOCUMENTS

| WO | WO 2008/109092 A1 | 9/2008 |
| WO | WO 2010/133353 A2 | 11/2010 |
| WO | WO 2010/133353 A3 | 11/2010 |

OTHER PUBLICATIONS

U.S. Appl. No. 13/302,700, filed Nov. 22, 2011, Spitzlinger, et al.

(Continued)

*Primary Examiner* — Ali Neyzari
(74) *Attorney, Agent, or Firm* — Oblon, Spivak, McClelland, Maier & Neustadt, L.L.P.

(57) ABSTRACT

A method for copy protection includes providing audiovisual or audio data stored in sectors of a record carrier having a file system, and providing additional or modified data to be stored in further sectors. The method includes generating a first file of the file system referencing at least a part of the sectors and none of the further sectors, so when the first file is rendered by a playback device, the data is reproduced which is included in the part of the sectors. The method also includes generating a second file of the file system being another file than the first file and referencing at least a part of the sectors and further referencing at least one of the further sectors, such that when the second file is rendered by the playback device the part of the sectors and the at least one of the further sectors are reproduced.

20 Claims, 17 Drawing Sheets

U.S. PATENT DOCUMENTS

| | | |
|---|---|---|
| 2005/0022232 A1 | 1/2005 | Green |
| 2005/0076061 A1 | 4/2005 | Cox |
| 2006/0236403 A1 | 10/2006 | Winter et al. |
| 2006/0291651 A1 | 12/2006 | Holzapfel et al. |
| 2007/0036356 A1 | 2/2007 | Holzapfel et al. |
| 2008/0222737 A1 | 9/2008 | Basile et al. |
| 2012/0250477 A1* | 10/2012 | Ueda et al. ............... 369/47.12 |

OTHER PUBLICATIONS

U.S. Appl. No. 13/302,771, filed Nov. 22, 2011, Spitzlinger, et al.

U.S. Appl. No. 13/302,747, filed Nov. 22, 2011, Spitzlinger, et al.

U.S. Appl. No. 13/302,713, filed Nov. 22, 2011, Spitzllinger, et al.

U.S. Appl. No. 13/302,735, filed Nov. 22, 2011. Spitzlinger, et al.

U.S. Appl. No. 13/371,953, filed Feb. 13, 2012, Ueda, et al.

U.S. Appl. No. 13,371,952, filed Feb. 13, 2012, Holzapfel, et al.

U.S. Appl. No. 13/320,428, filed Nov. 14, 2011, Markus Spitzlinger, et al.

European Search Report issued Sep. 9, 2011, in European Patent Application No. 11002699.4, filed Mar. 31, 2011.

* cited by examiner

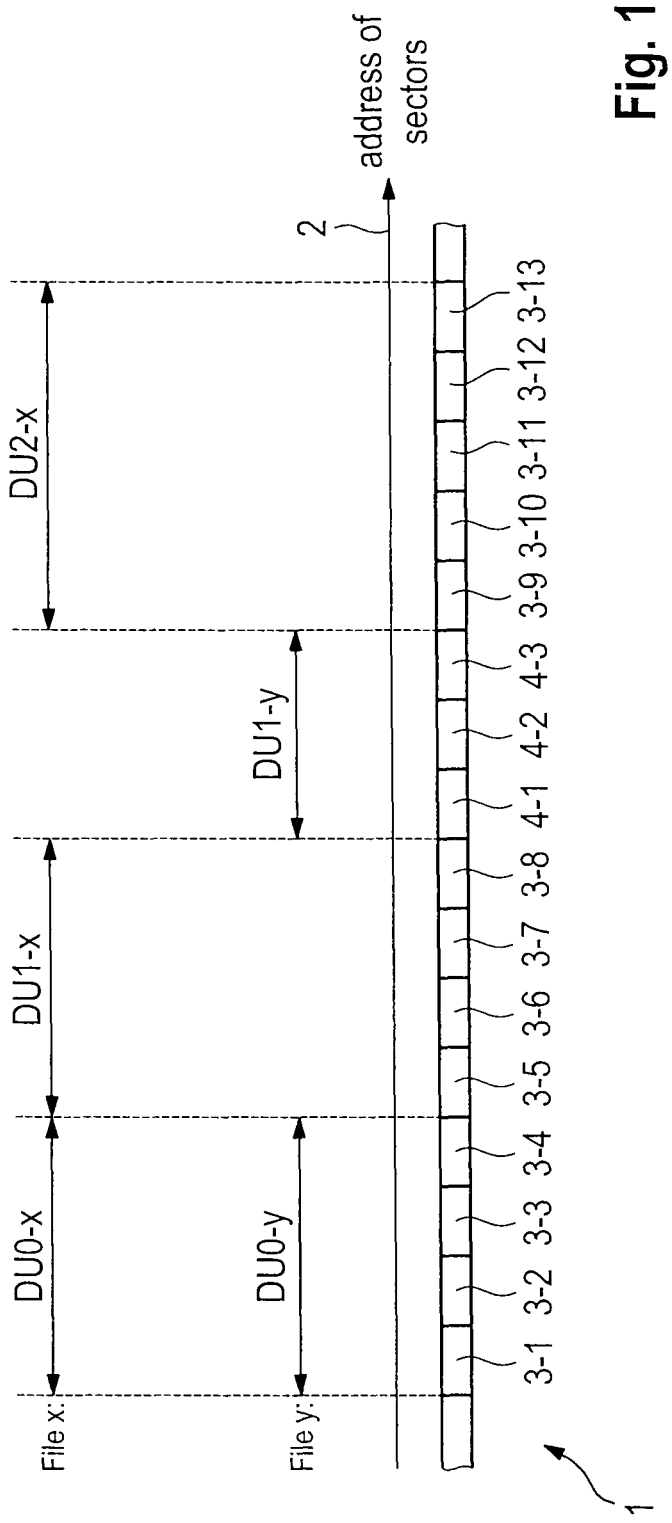

$00000.\text{m2ts} =$
$\text{Ext0}_0 +$
$\text{Ext1}_0 +$
$\text{Ext2}_0 +$
$\text{Ext3}_0 +$
$\text{Ext4}_0$ $00001.\text{m2ts} =$
$\text{Ext0}_1 +$
$\text{Ext1}_1 +$
$\text{Ext2}_1 +$
$\text{Ext3}_1 +$
$\text{Ext4}_1$

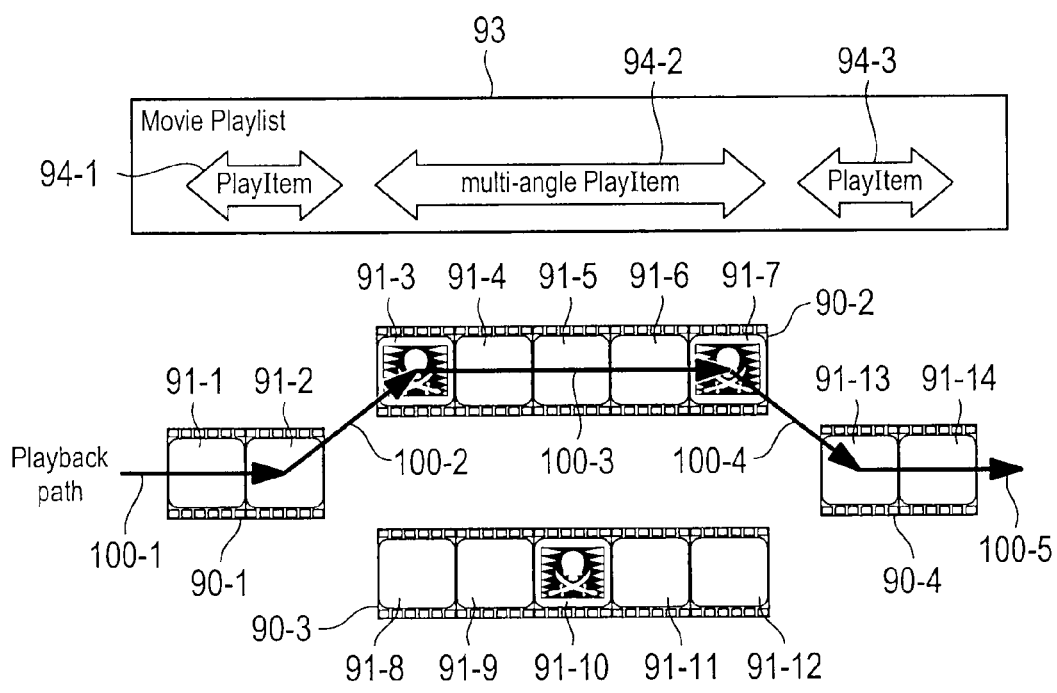
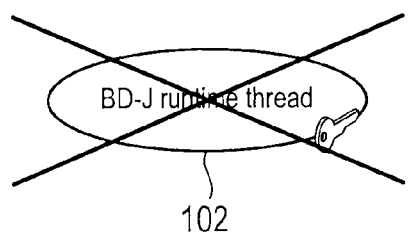
Fig. 13

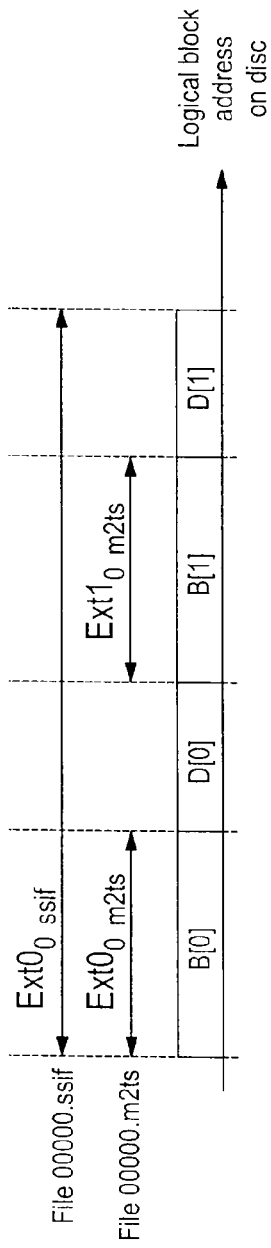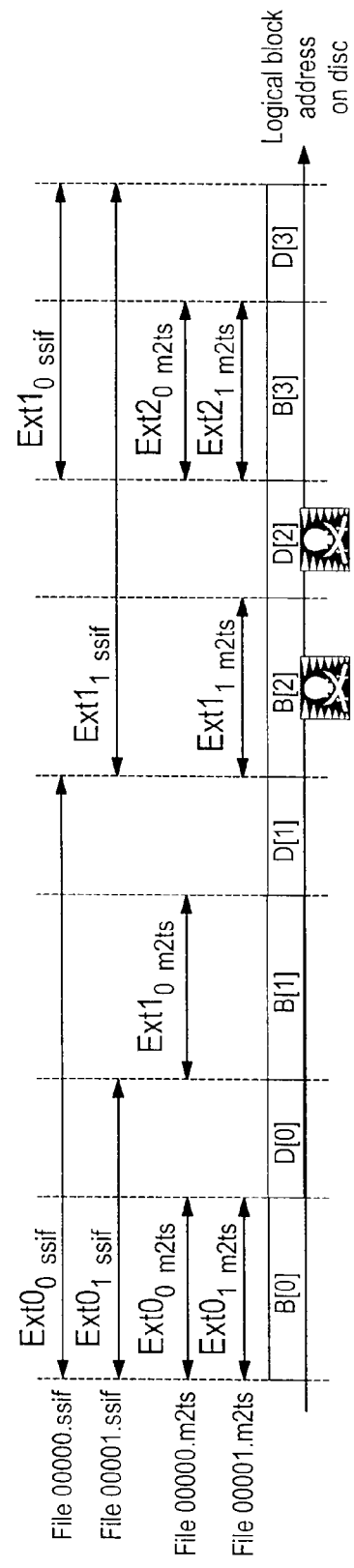

METHOD AND DEVICES FOR COPY PROTECTION, COPY PROTECTED RECORD CARRIER

Embodiments of the invention relate to methods, devices and systems for copy protection as well as to copy protected record carriers.

BACKGROUND

Various methods and algorithms for copy protecting content stored on a record carrier exist. Content that may be protected by such copy protection methods may e.g. be data such as computer programs, audiovisual content such as e.g. movies, and/or audio content in audio files.

However, many of the available methods and algorithms for copy protection have been "hacked", i.e. the copy protection may be removed from the record carrier and the content be distributed on recordable optical data carrier or as "ripped" versions stored on hard disks or other storages.

Thus, there is a constant need to improve the quality of copy protection methods and algorithms.

BRIEF SUMMARY

It is an object of embodiments of the invention to provide a method, a device and a system for copy protection. It is a further object of the invention to provide a copy protected record carrier.

These objects are solved by the independent claims.

Further details of the invention will become apparent from a consideration of the drawings and ensuing description.

BRIEF DESCRIPTION OF THE SEVERAL VIEWS OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar portions.

FIG. 1 shows an embodiment with interleaved files, wherein two different files X and Y reference at least partly the same sectors of a record carrier.

FIG. 13 shows an example how the copy protection of FIG. 12 works in case a hacker removed a BD-J runtime thread.

FIG. 17A shows the file structure of a 3D Blu-ray disc.

FIG. 17B shows how the concepts explained by means of FIGS. 1 to 16 may be explored in the context of a 3D Blu-ray disc.

DETAILED DESCRIPTION

Figure 2A:
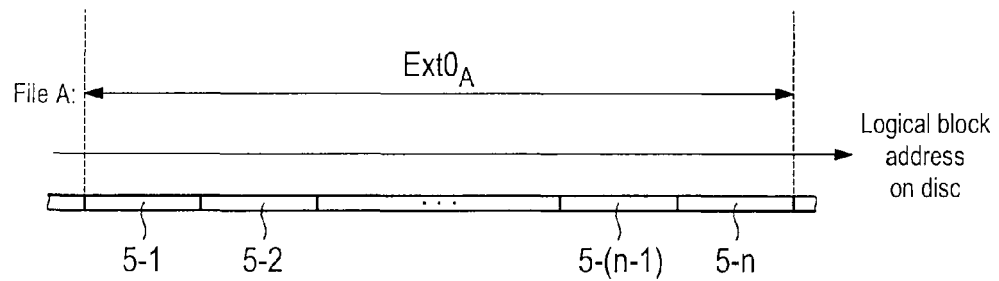
FIG. 2A shows a file A of a Blu-ray disc.

In the following, embodiments of the invention are described. It is important to note, that all described embodiments in the following may be combined in any way, i.e. there is no limitation that certain described embodiments may not be combined with others. Further, it should be noted that same reference signs throughout the figures denote same or similar elements.

It is to be understood that other embodiments may be utilized and structural or logical changes may be made without departing from the scope of the invention. The following detailed description, therefore, is not to be taken in a limiting sense, and the scope of the present invention is defined by the appended claims.

It is to be understood that the features of the various embodiments described herein may be combined with each other, unless specifically noted otherwise.

FIG. 1 shows a part of a record carrier 1. The part includes a plurality of sectors 3-1, 3-2, 3-3, 3-4, 3-5, 3-6, 3-7, 3-8, 3-9, 3-10, 3-11, 3-12, and 3-13 (in the following denoted with sectors 3-1, . . . , 3-13) and further sectors 4-1, 4-2, 4-3. A sector may also be referred to as a logical block and may include, depending on a standard of the record carrier 1, a predefined number of bytes.

The sectors 3-1, . . . , 3-13 may store binary data, audiovisual data and/or audio data which is copy protected as will be evident from the further description. The further sectors 4-1, 4-2, 4-3 may store additional or modified binary data, additional or modified audiovisual data and/or additional or modified audio data.

The binary data, audiovisual data and/or audio data stored in sectors 3-1, . . . , 3-13 may store original (genuine) data/content. In other words, in case only the data/content stored in sectors 3-1, . . . , 3-13 is read/reproduced by a reading device for the record carrier 1, the original data/content will be read/reproduced.

Depending on the design of the copy protection, the additional binary data, additional audiovisual data and/or additional audio data may include non-genuine data/content. Thus, in case any of the data/content stored in further sectors 4-1, 4-2, 4-3 is read/reproduced by a reading device for the record carrier 1, non-genuine data/content will be read/reproduced.

Each of the sectors 3-1, . . . , 3-13 and further sectors 4-1, 4-2 and 4-3 may be accessed based on an address of the respective sector. The address may also be referred to as "logical block address". In FIG. 1 and the following respective Figures, the addresses are indicated by an arrow (see arrow 2 in FIG. 1).

As indicated on the left hand side, record carrier 1 includes a first file X and a second file Y. First file X references the sectors 3-1, . . . , 3-13 and second file Y references the further sectors 4-1, 4-2 and 4-3. The referencing may be directly (not shown) or by way of data units. It should be noted that a referencing by way of data units is an option only and other ways of referencing may be possible. The data units may depend on the file system of the record carrier. For example, if the file system is the UDF (Universal Disk Format) file system, the data units may be referred to as "extents".

In the embodiment of FIG. 1, the referencing by means of data units is depicted.

As indicated, first file X includes data units DU0-X, DU1-X and DU2-X. First file Y includes data units DU0-Y and DU1-Y.

In case first file X is read/reproduced only data/content is read/reproduced which is referenced by first file X. In the example of FIG. 1, this would be data/content stored in sectors 3-1, . . . , 3-13.

Further, in case second file Y is read/reproduced only data/content is read/reproduced which is referenced by second file Y. In the example of FIG. 1, this would be data/content stored in sectors 3-1, . . . , 3-4 (included in data unit DU0-Y) and in further sectors 4-1, 4-2 and 4-3 (included in data unit DU1-Y).

Thus, in case of reading/reproducing second file Y, the additional binary data, additional audiovisual data and/or additional audio data will be read/reproduced too.

In the embodiment of FIG. 1, a copy protection is achieved since in case the second file Y is read/reproduced, non-genuine content and/or a non-genuine reproduction will occur. A copier (hacker) who is not aware which file to read/reproduce will make a copy with non-genuine content and/or a non-genuine reproduction will occur in case the copy is used for playback.

In a further embodiment, the copy protection may be enhanced by storing further second files such as second file Y on the record carrier. Each of the further second files are other files than the first file and the second file, the further second files respectively referencing at least a respective part of the plurality of sectors and further referencing at least a respective one of the plurality of further sectors, such that when a respective further second file is rendered by the playback device the respective part of the plurality of sectors and the respective one of the plurality of further sectors are reproduced.

In case of many second files (such as the second file Y in FIG. 1), a copier will not easily identify which file is a file only referencing sectors including binary data, audiovisual data and/or audio data, i.e. sectors including only genuine data/content in the correct reading order.

It should be noted that the record carrier 1 in FIG. 1 may conform to a certain standard for storing the data. The record carrier may e.g. be a CD-ROM, DVD, Blu-ray disc or of a future standard.

Also, it should be noted that FIG. 1 only shows sectors, further sectors, files and data units, e.g. extents in case of an UDF file system, for illustrative purposes. Depending on a real application, the number of sectors/further sectors included in a data unit, the number of data units included in a file may be set appropriately, e.g. larger than the number indicated in FIG. 1.

For illustration purposes, FIGS. 2A to 2D show an embodiment where the data carrier is a Blu-ray disc.

FIG. 2A shows an example of a file A referencing sectors 5-1, . . . , 5-n which are included in an extent $Ext0_A$. A sector (also referred to as "logical block") has a fixed number of bytes, e.g. 2048 bytes in case of Blu-ray and DVD. An extent (as an example of a data unit) is a contiguous sequence of sectors. It should be noted, though, that in contrast to files, according to the UDF file system of a Blu-ray disc, extents do not have names. However, in order to explain the various embodiments, throughout this specification extents are labeled (e.g. $Ext0_A$ in FIG. 2A).

Figure 2B:
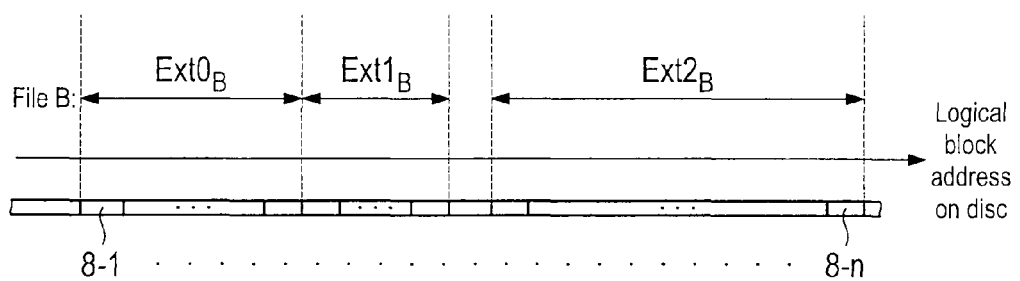
FIG. 2B shows a file B with a plurality of Extents of a Blu-ray disc.

FIG. 2B shows an example of a file B comprising a plurality of Extents $Ext0_B$, $Ext1_B$, and $Ext2_B$. Each of Extents $Ext0_B$, $Ext1_B$, and $Ext2_B$ may reference respective sectors or further sectors indicated as 8-1, . . . , 8-n.

Figure 2C:
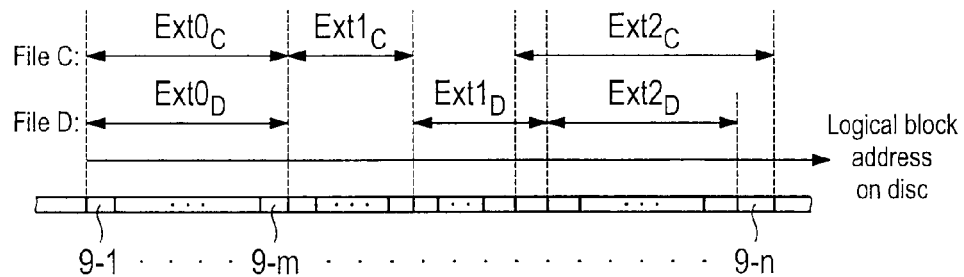
FIG. 2C shows two files C and D each referencing at least partly the same sectors of a Blu-ray disc.

As seen in FIG. 2C, the sectors and further sectors respectively storing binary data, audiovisual data and/or audio data and additional binary data, additional audiovisual data and/or additional audio data may be referenced by a plurality of Extents and, hence, by a plurality of files. As seen, e.g. sectors 9-1, . . . , 9-m are referenced by file C and file D (respectively via extent $Ext0_C$ and $Ext0_D$).

Moreover, it is possible that Extents share some logical blocks with other Extents, e.g. $Ext2_C$ shares logical blocks with $Ext1_D$ and $Ext2_D$. $Ext1_C$, however, does not share logical blocks with file D.

Figure 2D:
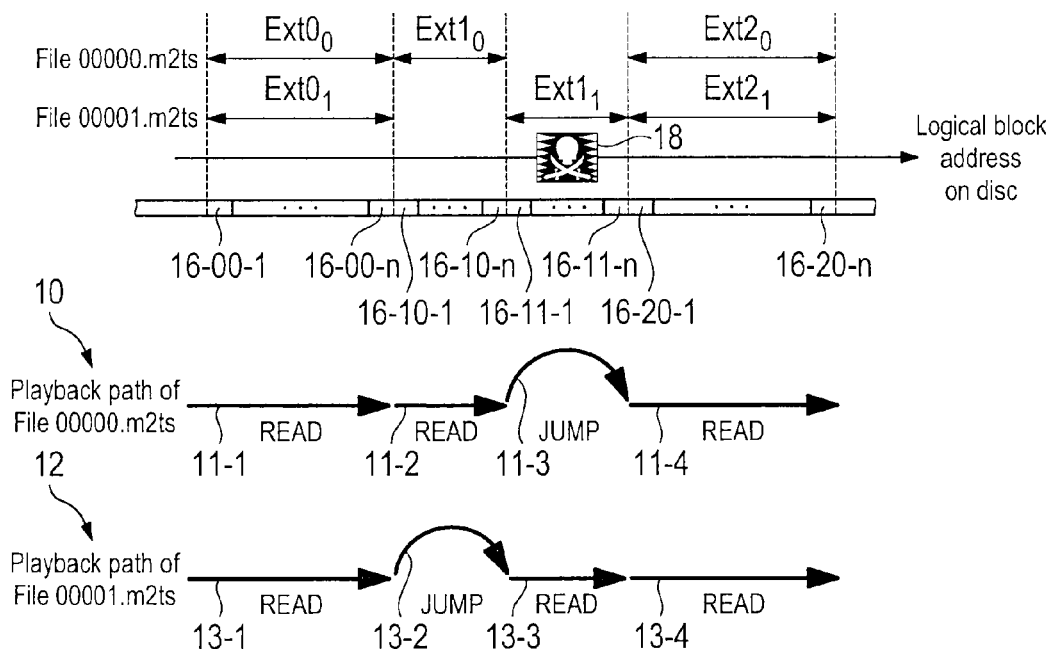
FIG. 2D shows an embodiment of a Blu-ray disc, wherein one of two files references sectors with additional video content (non-genuine content).

FIG. 2D shows an example with a first file 00000.m2ts and a second file 00001.m2ts. As shown, first file 00000.m2ts includes Extents $Ext0_0$, $Ext1_0$ and $Ext2_0$. Moreover, second file 00001.m2ts includes Extents $Ext0_1$, $Ext1_1$, and $Ext2_1$.

As seen, Extents $Ext0_0$ and $Ext0_1$ reference the same logical blocks (sectors) 16-00-1, . . . , 16-00-n on the disc. Moreover, the same is true for Extents $Ext2_0$ and $Ext2_1$ each referencing the same logical blocks (sectors) 16-20-1, . . . , 16-20-n. However, Extents $Ext1_0$ and $Ext1_1$ reference different logical blocks on the disc. Extent $Ext1_0$ references logical blocks (sectors) 16-10-1, . . . , 16-10-n and Extent $Ext1_1$ references logical blocks (further sectors) 16-11-1, . . . , 16-11-n.

In the example of FIG. 2D, the logical blocks (further sectors) 16-11-1, . . . , 16-11-n include additional or modified audiovisual data or additional or modified audio data, i.e. "no good" (bad) content (also e.g. referred to as "non-genuine" content as indicated by sign 18. Thus, in case the second file 00001.m2ts is reproduced by a playback device, the respective non-genuine content will be reproduced. On the other hand, in the example of FIG. 2D, it is also assumed that the logical blocks (sectors) 16-00-1, . . . , 16-00-n, 16-10-1, . . . , 16-10-n, and 16-20-1, . . . , 16-20-n referenced by the first file 00000.m2ts via Extents $Ext0_0$, $Ext1_0$ and $Ext2_0$ include original (genuine) content. Hence, in case the second file 00001.m2ts is reproduced, only the genuine content and non of the non-genuine content in the further sectors 16-11-1, . . . , 16-11-n is reproduced.

The further sectors 16-11-1, . . . , 16-11-n may e.g. include advertisements (in audio, in video or in both), video artifacts, audio artifacts, copyright infringement warnings, information how to purchase a legitimate copy, exchanged audio streams and the like.

The further sectors 16-11-1, ..., 16-11-$n$ may also correspond to a modified copy of sectors 16-10-1, ..., 16-10-$n$. In other words, Extent $Ext1_1$ (as an example of a data unit) may be a modified copy of $Ext1_0$. The modification may be such that the content included in the modified copy, i.e. in Extent $Ext1_1$, includes advertisements (in audio, in video or in both), video artifacts, audio artifacts, copyright infringement warnings, information how to purchase a legitimate copy, exchanged audio streams and the like. However, a format of the modified audiovisual data or audio data may be in conformity with a specification of the format of the audiovisual data or audio data of the respective one data unit.

For example, in case the content of extent $Ext1_0$ is stored in accordance with the MPEG-2 standard, then the content of extent $Ext1_1$ (modified copy of extent $Ext1_0$) may also be stored in accordance with MPEG-2 standard. In other words, also the modified copy of the content is in conformance with the corresponding specification, i.e. in conformity with the MPEG-2 specification. This may avoid that a copier (copy program, hacker, etc.) may easily detect that the content stored in extent $Ext1_1$ is non-genuine content by means of a format verification (e.g. by a computer program).

In the lower part of FIG. 2D reading the first file 00000.m2ts and the second file 00001.m2ts is depicted. As seen at 10, the playback path of the first file 00000.m2ts is such that extents $Ext0_0$, $Ext1_0$ and $Ext2_0$ are read consecutively. Since extents $Ext0_0$ and $Ext1_0$ reference respective logical blocks which are adjacent to each other (see last sector 16-00-$n$ of $Ext0_0$ is adjacent to first sector 16-10-1 of $Ext1_0$ in a reading direction indicated by arrows 11-1, ..., 11-4), a reading head of a playback device can continuously move across the Blu-ray disc. However, after reading the last sector 16-10-$n$ of Extent $Ext1_0$ a reading head of a playback device has to jump to the first logical block 16-20-1 of $Ext2_0$ as indicated by arrow 11-3. The reason that a jump is necessary is because the last logical block 16-10-$n$ of Extent $Ext1_0$ is not adjacent to the first logical block 16-20-1 of Extent $Ext2_0$.

Similarly, when reading the second file 00001.m2ts, a reading head which consecutively reads the data of extents $Ext0_1$, $Ext1_1$ and $Ext2_1$, the reading head moves as indicated by arrows 13-1, ..., 13-4. Thus, after reading $Ext0_1$, a jump is necessary as indicated by arrow 13-2.

It should be noted that depending on a practical implementation, extents may not be freely or arbitrarily distributed across a data carrier and may be subject to size constraints in accordance with the relevant format specification. An arbitrary distribution may cause the playback device to run into buffer underflows in case the distances between two extents to be read consecutively becomes too large (large jumps would be necessary which takes time). Consequently, it may be advantageous to adhere to the maximum distance which is allowed between two extents to be read consecutively within one file. Also it may be favorable to respect the size constraints defined for the related format specification.

Figure 3:
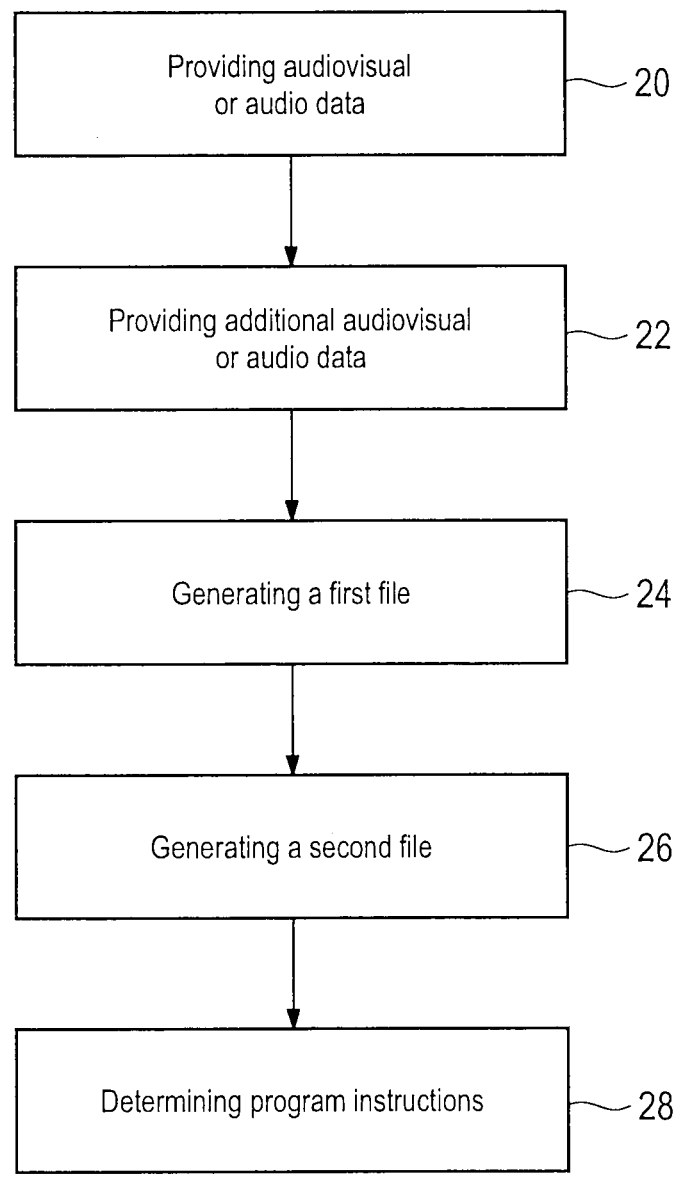
FIG. 3 shows a flow chart of a method for copy protection.

FIG. 3 shows a method for copy protection. At 20 audiovisual data or audio data is provided. This may be data representing original content which is to be copy protected. The audiovisual data or audio data is stored in a plurality of sectors of a record carrier, e.g. sectors 16-00-1, ..., 16-00-$n$, 16-10-1, ..., 16-10-$n$ and 16-20-1, ..., 16-20-$n$.

At 22, additional or modified audiovisual data or additional or modified audio data is provided. This additional or modified audiovisual data or additional or modified audio data is to be stored in a plurality of further sectors of the record carrier such as e.g. sectors 16-11-1, ..., 16-11-$n$ shown in FIG. 2D.

At 24, a first file is generated. This may, e.g. be the first file 00000.m2ts shown in FIG. 2D.

At 26, a second file is generated. This may, e.g. be the second file 00001.m2ts shown in FIG. 2D.

At 28 in FIG. 3 an optional step/process is depicted. Accordingly, it is possible that program instructions are generated which are to be stored on the record carrier which is to be copy protected. The program instructions, when executed by the playback device may extract characteristic parameters of the record carrier. Based on the characteristic parameters the first file may be discriminated from the second file. The extraction of characteristic parameters is also described in WO 2010/133353 (PCT/EP2010/003073) which is herewith incorporated by reference in its entirety.

As an example, in the example of FIG. 2D, it is possible that program instructions are generated and stored on the record carrier, wherein the program instructions allow to select the first file 00000.m2ts for playback in order to avoid that the additional or modified audiovisual data or additional or modified audio data stored in sectors 16-11-1, ..., 16-11-$n$ is reproduced.

As already indicated in connection with FIG. 1 above, for copy protection, it may be advantageous to include a plurality of files such as the second file 00001.m2ts in FIG. 2D on a record carrier which each respectively reference "further sectors" including non-genuine content and e.g. only one file referencing only sectors storing genuine content. In the context of an embodiment based on a Blu-ray disc, this would mean to include a plurality of files such as the second file 00001.m2ts of FIG. 2D in the UDF file system of the Blu-ray disc. Since such a plurality of second files include non-genuine content and may be generated by the creator of the disc for copy protection purposes, such files may also be referred to as "fake files".

Figure 4:
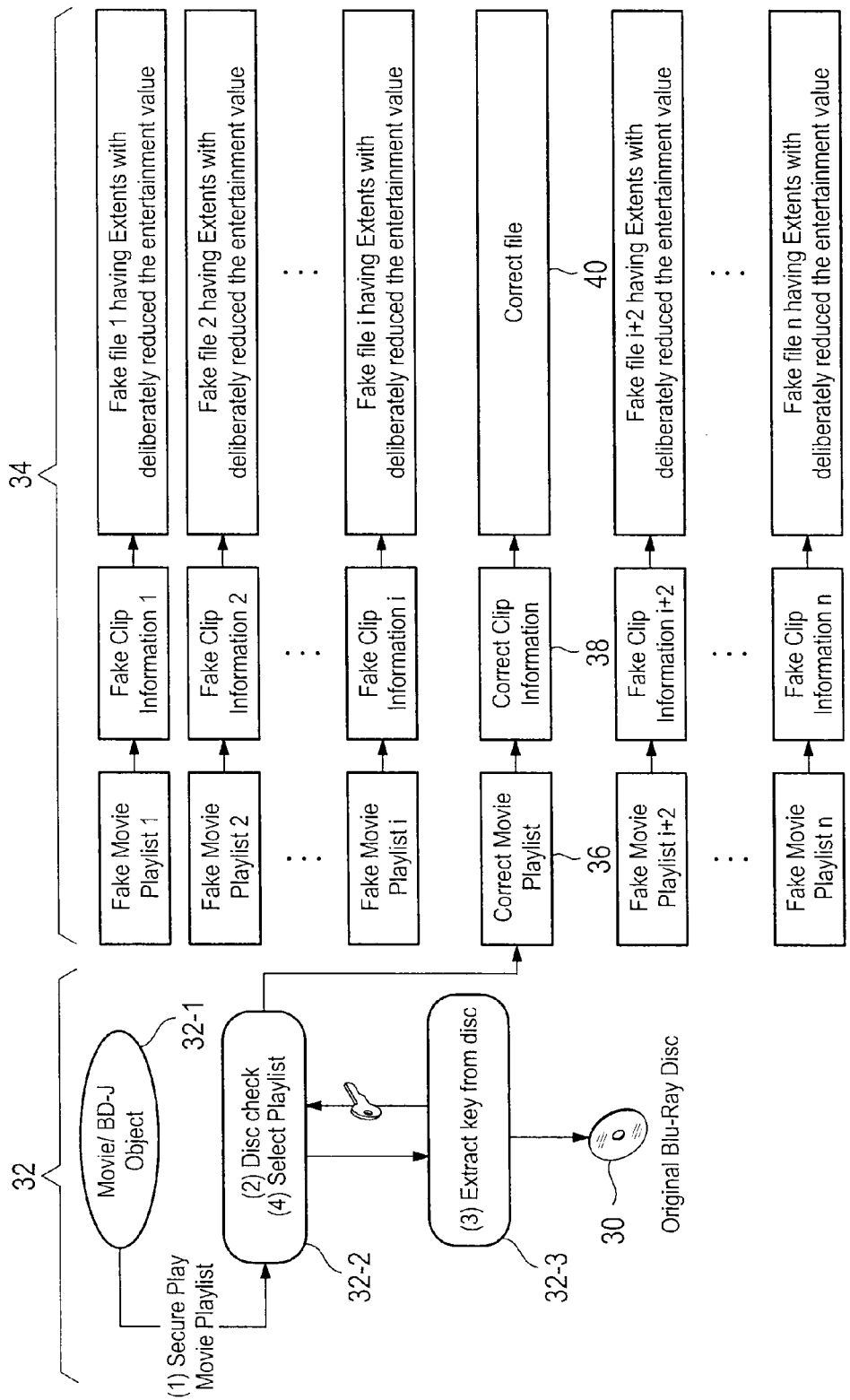
FIG. 4 shows an embodiment with a plurality of playlists.

In a further embodiment shown in FIG. 4, the concept of having a plurality of such "fake files" is explored. Thereby, a Blu-ray disc 30 includes data as indicated at 34, i.e. the Blu-ray disc 30 includes a plurality of fake movie playlists 1, ..., i, i+2, ..., n respectively referencing fake clip information files 1, ..., i+2, ..., n which in turn reference fake files 1, ..., i, i+2, ..., n. The fake files reference at least one extent which references at least one "further sector" (i.e. a sector storing non-genuine content), such that in case any of the fake movie playlists 1, ..., i, i+2, ..., n is used for playback, content with a reduced entertainment value (non-genuine content) will be reproduced.

For reproduction of the genuine content, the Blu-ray disc includes a correct movie playlist 36 referencing a correct clip information file 38 which references correct file 40. Correct file 40 includes only extents referencing sectors including (all) genuine content (i.e. correct file 40 could e.g. be the first file 00000.m2ts in FIG. 2D). In other words, in case the correct movie playlist 36 is used for playback by a playback device, the genuine content will be reproduced.

At 32, i.e. at the left-hand side of FIG. 4, a playback process of the Blu-ray disc 30 is depicted. In the example of FIG. 4 it is assumed that the Blu-ray disc 30 is an original and, hence, the correct movie playlist 36 will be found which allows playback of the genuine content in genuine quality stored on Blu-ray disc 30.

When the Blu-ray disc 30 is read, at first the movie/BD-J object is executed by a respective playback device as indicated at 32-1. Within the movie/BD-J object, a playlist is selected/generated which is then further used for playback. Therefore, at first a disc check is performed as indicated at 32-2. This is done by extracting key information from the disc. This key information is then used to select a playlist for playback.

For a better understanding of what is meant by "extracting key information from the disc", the following may be noted (see also WO 2010/133353 (PCT/EP2010/003073) which is herewith incorporated by reference in its entirety):

Every record carrier has a certain physical structure and contains certain data stored thereon. Thereby, the physical structure of a pre-recorded (original) record carrier is generally different from a copy of the pre-recorded record carrier e.g. on a recordable record carrier such as e.g. a recordable optical record carrier or hard disc. For example, if the pre-recorded record carrier is an optical record carrier, on the pre-recorded record carrier, certain patterns of pits and lands might exist that are different on the recordable record carrier, since e.g. a copier (e.g. copy program) cannot copy the certain patterns. On a pre-recorded record carrier the physical structure and data is inscribed in a glass mastering process and mass replicated via stamping, while on a recordable record carrier the physical structure is pre-inscribed and the data is burned with a high-power laser beam (by changing the transparency of a dye) in a recording device.

Also, e.g. if the pre-recorded record carrier has copy protected original data stored thereon and a recordable record carrier is a copy of the pre-recorded record carrier having copied data, the original data and copied data might be different. For example, in the copied data, encryption characteristics or encryption parameters of the original data might not be included. Further, e.g. the file system of the copied data might deviate from that of the original data.

Thus, from a pre-recorded (original) record carrier, certain original characteristic parameters (a "key") may be derived. These original characteristic parameters may depend on the physical structure of the pre-recorded (original) record carrier and/or on the (original) data stored on the pre-recorded (original) record carrier. The original characteristic parameters of the physical structure may be extracted from the pre-recorded carrier by a reading device, e.g. an optical pickup or a reading head of a hard disk, i.e. a reading device might be controlled to access the physical structure in a certain manner.

Also, from a recordable record carrier that is a copy of the pre-recorded (original) record carrier, certain copy characteristic parameters may be derived. These copy characteristic parameters may depend on the physical structure of the recordable record carrier and/or on the copied data stored on the recordable record carrier. The copy characteristic parameters of the physical structure may be extracted from the recordable carrier by a reading device, e.g. an optical pickup or a reading head of a hard disk, i.e. a reading device might be controlled to access the physical structure in a certain manner.

If the manner in which the copy characteristic parameters are extracted from the recordable record carrier is the same as for extracting the original characteristic parameters from the pre-recorded record carrier and if the copy characteristic parameters deviate from the original characteristic parameters, this may be used in various ways. For example, it could be used for detecting that data is read from a copy (original disc check). Moreover, the parameters can be used for various algorithms for copy protection.

The original characteristic data and copy characteristic data may also be referred to as "key", "key material" or "key data" that is explored in various ways for copy protecting data. In the embodiment of FIG. 4, the keys are extracted at 32-2 and at 32-2 the keys are used as input data for an algorithm for finding a correct playlist.

Figure 5:
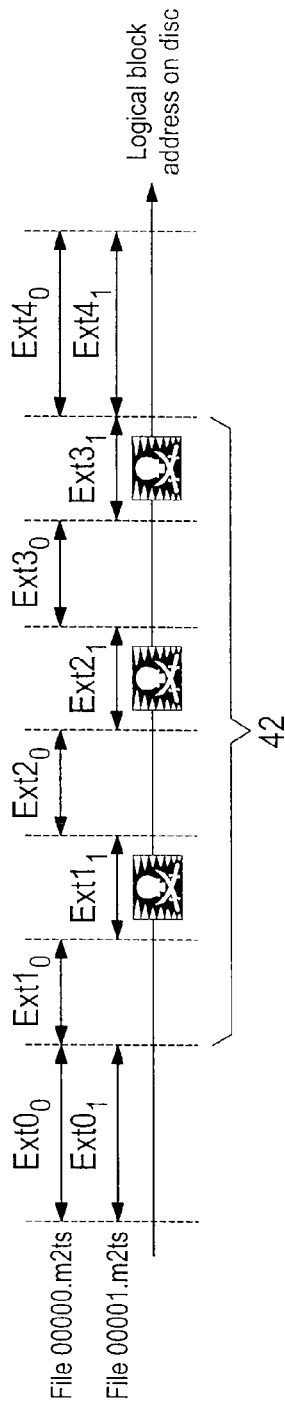
FIG. 5 shows an embodiment wherein a plurality of Extents exist referencing non-genuine content.

FIG. 5 shows a further embodiment with a region of interleaved files.

As seen, in this example the first file 00000.m2ts includes Extents $Ext0_0$, $Ext1_0$, $Ext2_0$, $Ext3_0$, and $Ext4_0$ referencing respective logical blocks (sectors) storing audiovisual data or audio data (original content).

Further, the second file 00001.m2ts includes Extents $Ext0_1$, $Ext1_1$, $Ext2_1$, $Ext3_1$, and $Ext4_1$. As seen, Extents $Ext0_1$ and $Ext4_1$ respectively reference the same logical blocks as Extents $Ext0_0$ and $Ext4_0$ included in the first file 00000.m2ts. Therefore, the sectors references by these Extents may also be referred to as "shared sectors".

However, Extents $Ext1_1$, $Ext2_1$, and $Ext3_1$ reference logical blocks including additional or modified audiovisual data or additional or modified audio data (non-genuine content including e.g. advertisement and the like).

Thus, in case the second file 00001.m2ts is used for playback, additional or modified audiovisual data or additional or modified audio data will be reproduced.

For copy protection, the first file may be included in the correct clip information 38 shown in FIG. 4 whereas the second file 00001.m2ts may be included in any of the fake clip information files 1, . . . , i, i+2, . . . n included in the fake movie playlists 1, . . . , i, i+2, . . . n.

In the embodiment of FIG. 5, Extent $Ext1_1$ may be a modified copy of Extent $Ext1_0$ wherein the format of the data of Extent $Ext1_1$ and the format of the data of Extent $Ext1_0$ is the same as explained above in connection with FIG. 2D. As indicated above, this may avoid that a copier (copy program, hacker, etc.) may easily detect that the content stored in extent $Ext1_1$ is non-genuine content. In other words, a copier may not easily recognize which of the first file 00000.m2ts and the second file 00001.m2ts includes only the genuine content and, hence, leads to playback of (only) genuine content (file 00000.m2ts in the example of FIG. 5). If the format of both files is valid, the hacker would have to compare the first file 00000.m2ts and the second file 00001.m2ts manually which is laborious.

Since in a region 42 of the disc of the embodiment of FIG. 5 a plurality of extents are found which cannot be distinguished based on a format of the data stored therein, copy protection may be enhanced.

On the other hand, in the embodiment of FIG. 5, an extent referencing non-genuine content (Extents $Ext1_1$, $Ext2_1$, and $Ext3_1$) always follows an extent referencing genuine content (Extents $Ext1_0$, $Ext2_0$, $Ext3_0$) which may make it easier for a hacker to hack the copy protection.

Figure 6:
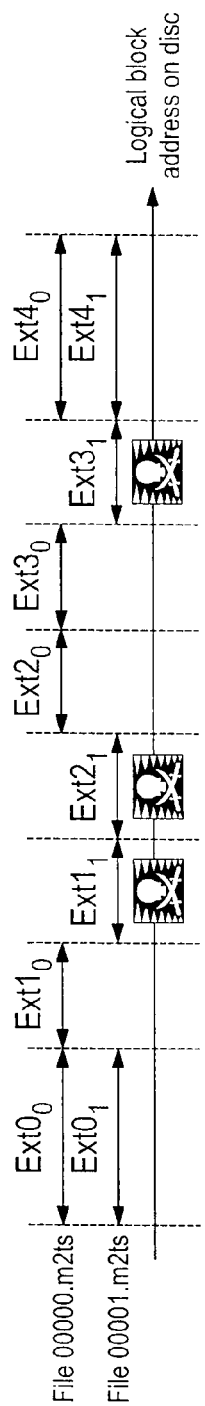
FIG. 6 shows a further embodiment with a plurality of Extents that reference non-genuine content, however, the order of the Extents being different with respect to the embodiment of FIG. 5.

Therefore, in the embodiment of FIG. 6, such a pattern is avoided.

In the embodiment shown in FIG. 6, Extent $Ext1_1$ is a modified copy of Extent $Ext1_0$. Further, Extent $Ext2_1$ is a modified copy of Extent $Ext2_0$. Still further, Extent $Ext3_1$ is a modified copy of Extent $Ext3_0$.

As seen, the difference between FIGS. 5 and 6 is that in FIG. 5 a regular pattern may be detected such that an Extent including original content is always followed by a modified copy. This is not the case in FIG. 6. Therefore, it will be harder for a copier to guess the file with the original content.

Figure 7:
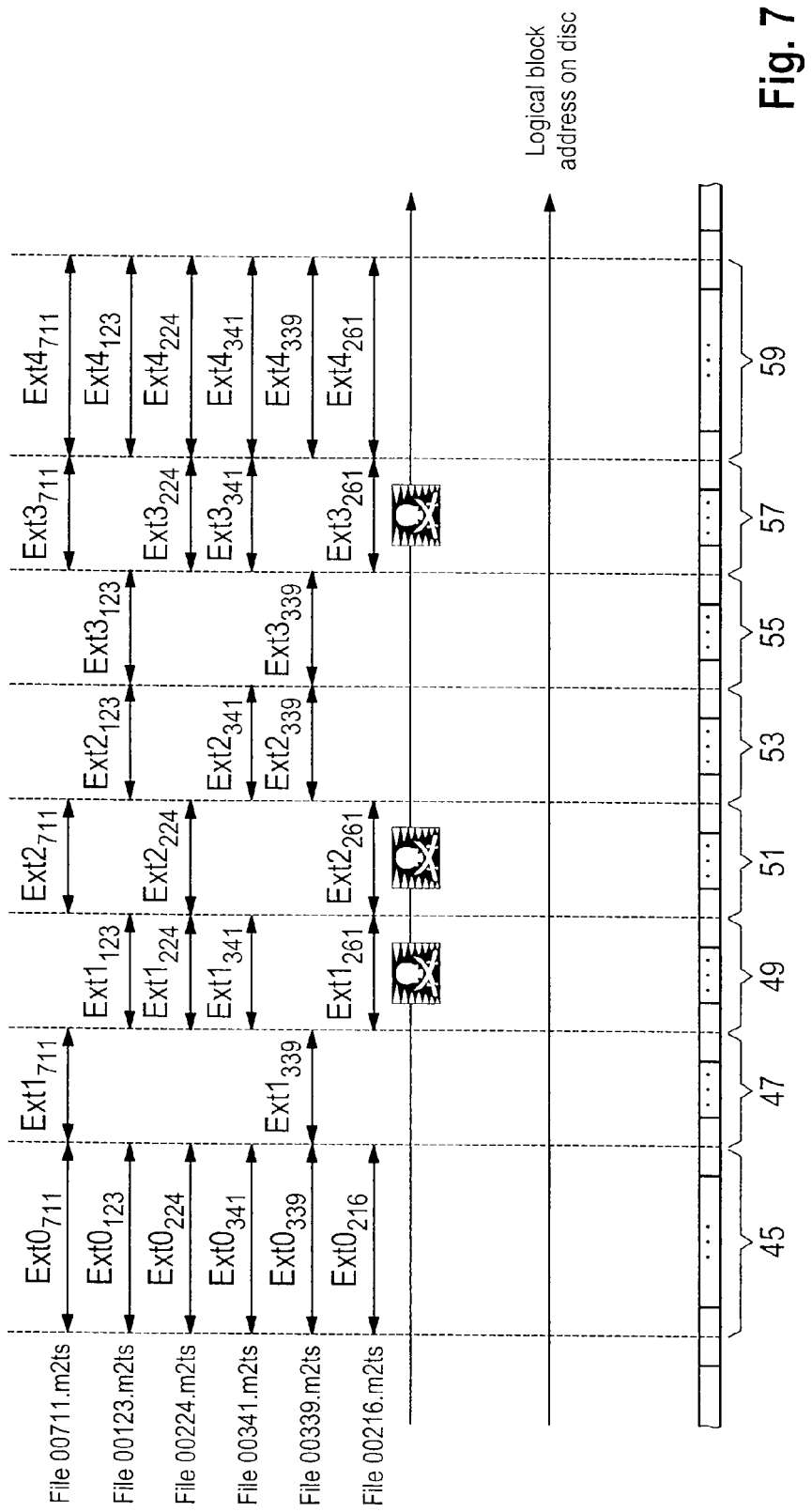
FIG. 7 shows an embodiment with a large number of files.

FIG. 7 shows an embodiment with a large number of different files. This will make it very difficult to determine which file stores the original content.

In the example of FIG. 7, only file 00339.m2ts has the original content (note file 00339.m2ts references regions of sectors 45, 47, 53, and 59 including only genuine content). All other files 00711.m2ts, 00123.m2ts, 00224.m2ts, 00341.m2ts, and 00216.m2ts reference regions of sectors 49, 51, and 57 including non-genuine content (as indicated by the same sign used above in FIG. 2D for denoting non-genuine content).

Regarding FIG. 7 it should also be noted that, as seen, physically allocated data (regions of sectors) may be included in a plurality of different files. For example, the sectors in region 45 are included in extents $Ext0_{711}$, $Ext0_{123}$, $Ext0_{224}$, $Ext0_{341}$, $Ext0_{339}$ and $Ext0_{216}$, which are respectively referenced by files 00711.m2ts, 00123.m2ts, 00224.m2ts, 00341.m2ts, 0330.m2ts and 00216.m2ts. Hence, fake files may be created without the need of physically allocating additional data (space on record carrier). Thus, there may be many files which share the majority of their content by having data units, e.g. extents, referencing the same sectors. This way a large number of files may be put onto a data carrier with a limited space. This concept may also be referred to as "sharing content" and is also further explored in other embodiments described throughout the specification and may be combined with any of the described embodiments. Thus, as seen in FIG. 7, it is possible that a "first file" (file 0339.m2ts) referencing none of further sectors including "no good" content includes first data units (e.g. $Ext0_{339}$), and a "second file" (e.g. 00711.m2ts) referencing the further sectors (e.g. sectors 49, 51, 57) include second data units (e.g. $Ext0_{711}$), wherein the first and second data units at least partly reference the same sectors (in the example sectors denoted with 45).

Figure 8:
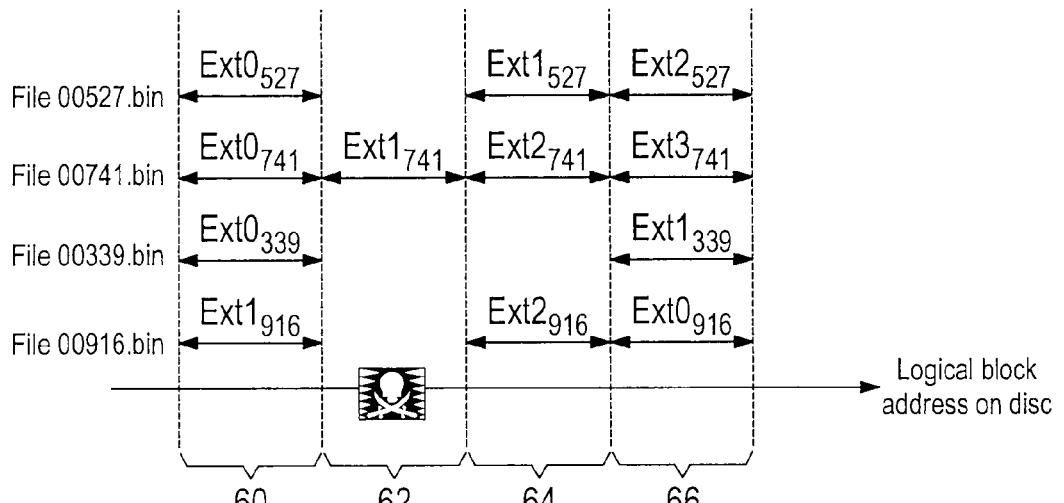
FIG. 8 shows an embodiment for copy protecting binary data.

FIG. 8 shows an embodiment where binary data is copy protected. In the example of FIG. 8, only file 00527.bin is an original file.

The remaining files 00741.bin, 00339.bin, and 00916.bin are fake files. Fake files may be generated by e.g. adding Extents with additional data (cf. file 00741.bin in FIG. 8), omitting some Extents (cf. file 00339.bin in FIG. 8), jumbling the order to the Extents (cf. file 00916.bin in FIG. 8). Also, any combinations of such techniques are possible.

The embodiment of FIG. 8 may be used for copy protecting computer games stored on a Blu-ray disc. In case any of the fake files are used within a computer game, the game may terminate. Alternatively, it is also possible that the game may only be played with a reduced entertainment value. For example, certain features of the game may not be available or a player may not reach certain levels of the game.

Figure 9:
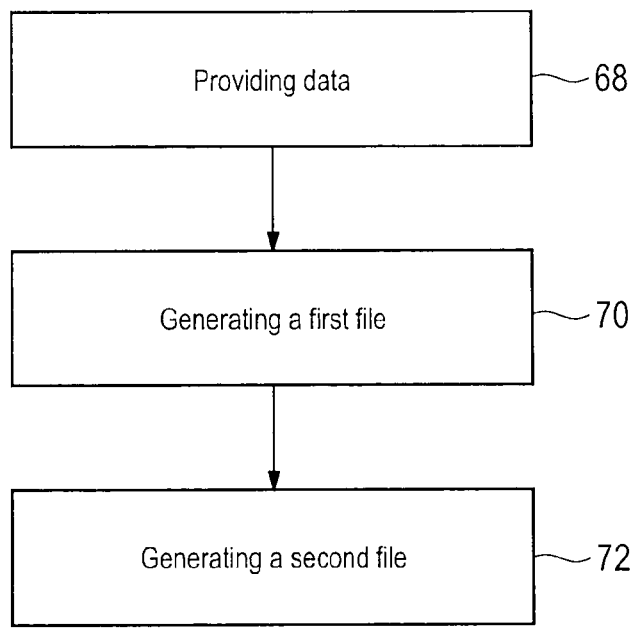
FIG. 9 shows a flow chart of a method for copy protecting binary data.

FIG. 9 shows a method for copy protecting data to be stored on a record carrier, e.g. similarly as shown in FIG. 8.

At 68, data is provided which is to be stored in a plurality of sectors.

At 70, a first file is generated which is to be stored on the record carrier. The first file references a plurality of sectors in a first order wherein when the file is read by a reading device for the record carrier, the data is read in the original byte order.

At 72, a second file is generated which is to be stored on the record carrier. The second file is another file than the first file and may reference at least a part of the plurality of sectors in a second order, wherein when the second file is read by the reading device for the record carrier, the data is not read in the original byte order (see e.g. file 00916.bin where, when the file is read, first $Ext0_{916}$ is read and then consecutively Extents $Ext1_{916}$ and $Ext2_{916}$). The generation of the second file may also include (alternatively or additionally) adding Extents with additional data (cf. file 00741.bin in FIG. 8), omitting some Extents (cf. file 00339.bin in FIG. 8), jumbling the order to the Extents (cf. file 00916.bin in FIG. 8) and any combinations of such techniques.

Figure 10:
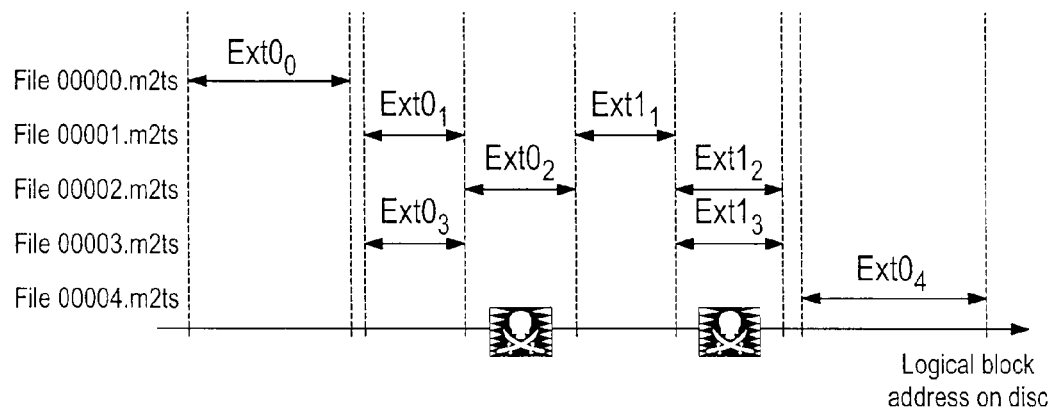
FIG. 10 shows an embodiment where some files include only genuine content whereas other files include genuine and non-genuine content.

FIG. 10 shows a further embodiment according to which large sized content hash tables may be avoided.

In accordance with the AACS encryption standard for Blu-ray discs, hash values which are stored in hash tables are generated for each file stored on a Blu-ray disc. Thereby, the number of hash values generated for one file grows with the size of the respective one file (one hash value is generated for each block of 96 sectors).

Hence, by including a large number of "fake files" as e.g. shown in FIG. 4 (cf. fake clip information files 1, . . . , i, i+2, . . . , n) and FIG. 7 (cf. files 00711.m2ts, 00123.m2ts, 00224.m2ts, 00341.m2ts, and 00216.m2ts) the size of the hash table grows. Also, in case of large "fake files", the hash table stored on a Blu-ray disc becomes large.

When playing back a Blu-ray disc some playback devices read the entire hash table into a memory in order to perform the AACS Content Verification process. This may be a problem for some playback devices having only a small sized memory for storing the hash table. It should be noted, though, that not all playback devices have such a problem and, hence, FIG. 10 only shows an option which could be used in combination with all other described embodiments.

In order to avoid this problem, in the embodiment of FIG. 10, only small sized files including Extents referencing non-genuine content stored in respective sectors are foreseen. In FIG. 10 such small sized files are files 00002.m2ts and 00003.m2ts. In the framework of the embodiment shown in FIG. 4, the small sized files 00002.m2ts and 00003.m2ts could be includes in fake movie playlists 1, . . . , i, i+2, . . . , n. In addition, also other files ("further first files" referencing none of the sectors storing none-genuine content), e.g. any of files 00000.m2ts, 00001.m2ts and 00004.m2ts, could be mixed into the fake movie playlists. It is also possible to include the small sized files 00002.m2ts and 00003.m2ts a plurality of times in a single fake playlist.

Thus, according to the embodiment of FIG. 10, copy protection can be achieved based on small sized files including non-genuine content. Therefore, the above mentioned problem of some playback devices having only a small memory for storing a respective hash table may be avoided.

The correct movie playlist 36 could include files 00000.m2ts, 00001.m2ts and 00004.m2ts which all reference only genuine content stored in respective sectors.

For assuring a seamless playback, the play items of the playlists should be marked with a respective connection condition, e.g. connection condition 5 or 6.

Figure 11A:
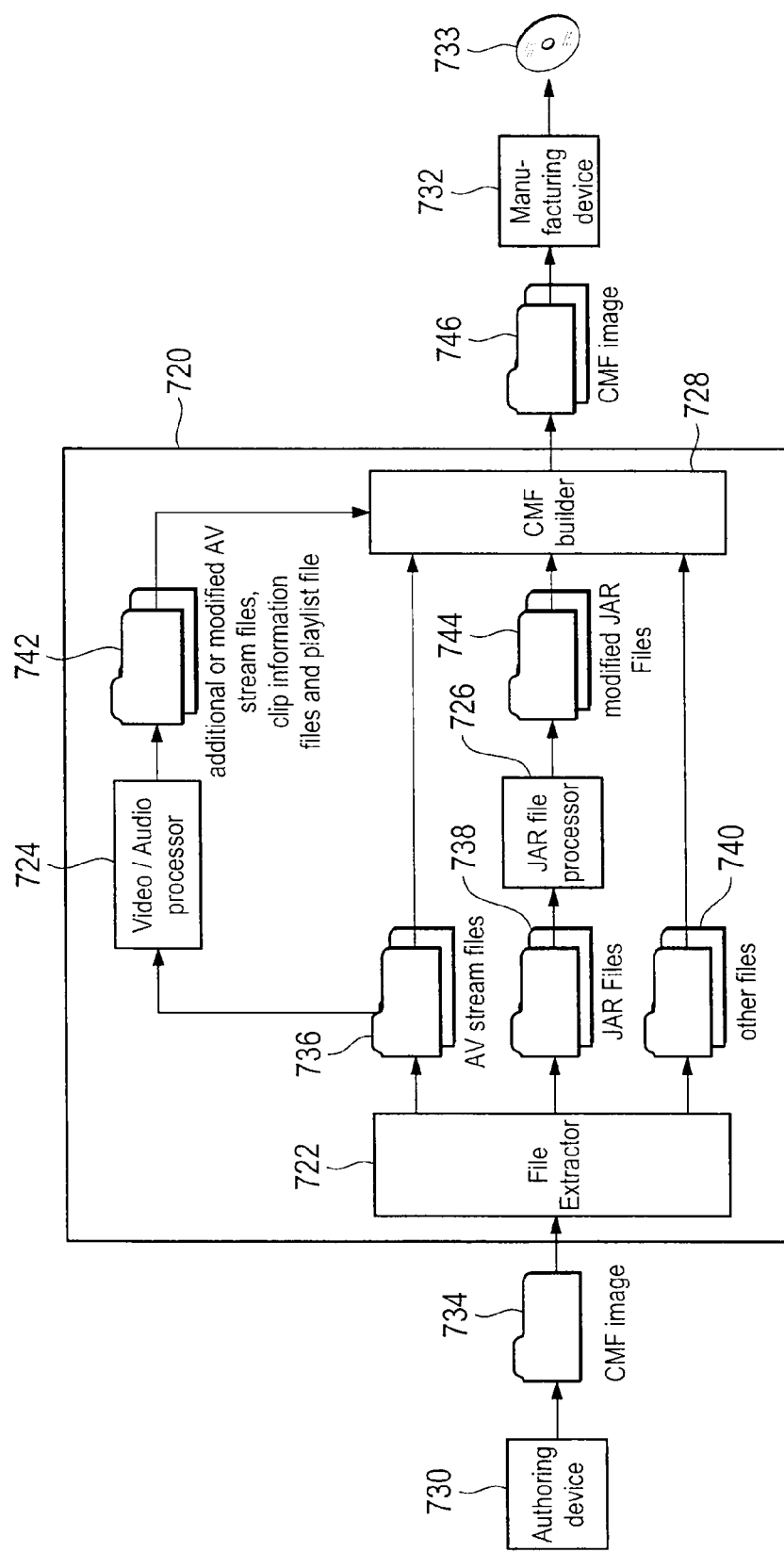
FIG. 11A shows a device for generating an image for the manufacturing a copy protected Blu-ray disc.

FIG. 11A shows an image generation processor 720 which is adapted to generate an image for the manufacturing of a copy protected record carrier 733. The image generation processor 720 includes a file extractor 722, a video/audio processor 724, a JAR file processor 726 and a CMF builder 728. "JAR" stands for "JAVA archive" and is the format used to store executable JAVA byte code which is read and executed by a Blu-ray player during playback.

As depicted at 730 and 732, the image generation processor 720 is connected to an authoring device 730 and manufacturing device 732, respectively.

The authoring device 730 allows performing an authoring process which may or may not be done at the location of the image generation processor 720. Likewise, the manufacturing device 732 which is adapted to perform a manufacturing process such as e.g. manufacturing a glass master etc. may be located at the location of the image generation processor 720 or may be located elsewhere.

For example, the image generation processor 720 may be located at a company site of a first company. Further, the authoring device 730 may be located at the site of a second company and, moreover, the manufacturing device 732 may be located at the side of a third company (or at the site of the second company). Thus, in case of three different companies all three companies may cooperate together smoothly by only exchanging data and thus generate a record carrier 733. Each company may be doing its business independently from the others.

As depicted at 734, the authoring device 730 delivers a CMF (Cutting Master Format) image. Other suitable data formats may also be used. However, for Blu-ray discs, the CMF image may be used.

The CMF image 734 is received by the file extractor 722. The file extractor 722 may be a specialized hardware or may be a general purpose data processor. The file extractor 722 generates from the CMF image 734 AV stream files 736, JAR files 738 and other files 740.

The AV stream files 736 include the original (genuine) audiovisual data or audio data.

As depicted, the AV stream files 736 are supplied to the CMF builder 728 as well as to the video/audio processor 724. The video/audio processor 724 generates additional or modified AV stream files, clip information files and playlist files which are depicted at 742.

In other words, the video/audio processor 724 is adapted to generate the above described additional or modified audiovisual data or additional or modified audio data (referred to as additional or modified AV stream files in FIG. 11A).

The additional or modified AV stream files 742 (which are to be stored in a plurality of the further sectors of the record carrier 733) are fed to the CMF builder 728.

The JAR file processor 726 uses the JAR files 738 to generate modified JAR files 744 by inserting a copy protection functionality in the JAR files. For example, the JAR file processor 726 may generate a key extraction process, a playlist selection process etc. as e.g. described in connection with FIG. 4. In other words, the modified JAR files 744 ensure that in case of playback from an original record carrier, the original (genuine) content will be rendered in genuine quality.

The CMF builder 728 receives the additional or modified AV stream files 742, the original AV stream files 736, the modified JAR files 744 and the other files 740 and generates a new CMF image 746 which is then supplied to the manufacturing device 732 for manufacturing a copy protected record carrier 733.

As noted above, the copy protection may, thus, be added independently from the authoring device 730. This can be an advantage since often authoring is done at different sites or different companies than the adding of copy protection which may be done at the site where the optical record carriers are manufactured. Of course it would also be possible to completely separate the copy protection addition from the authoring and manufacturing as well.

Figure 11B:
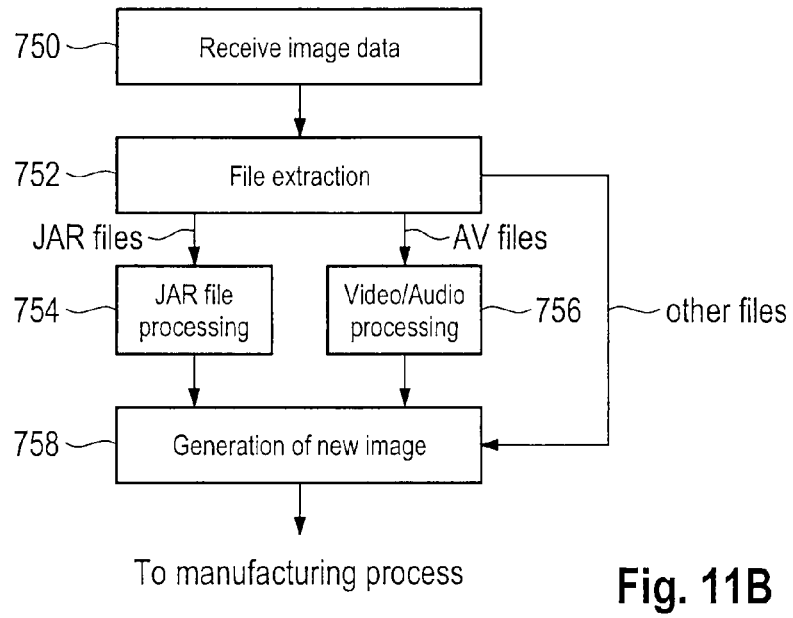
FIG. 11B shows a method for generating an image for the manufacturing a copy protected Blu-ray disc.

FIG. 11B shows steps of a method for generating a new image file.

At 750, the image data, e.g. the CMF image 734 of FIG. 11A, is received.

At 752, the JAR files, AV files and other files are extracted.

At 754, the JAR files are processed as described for FIG. 11A.

At 756, the AV files are processed as described for FIG. 11A.

At 758, the new image file is generated.

Figure 11C:
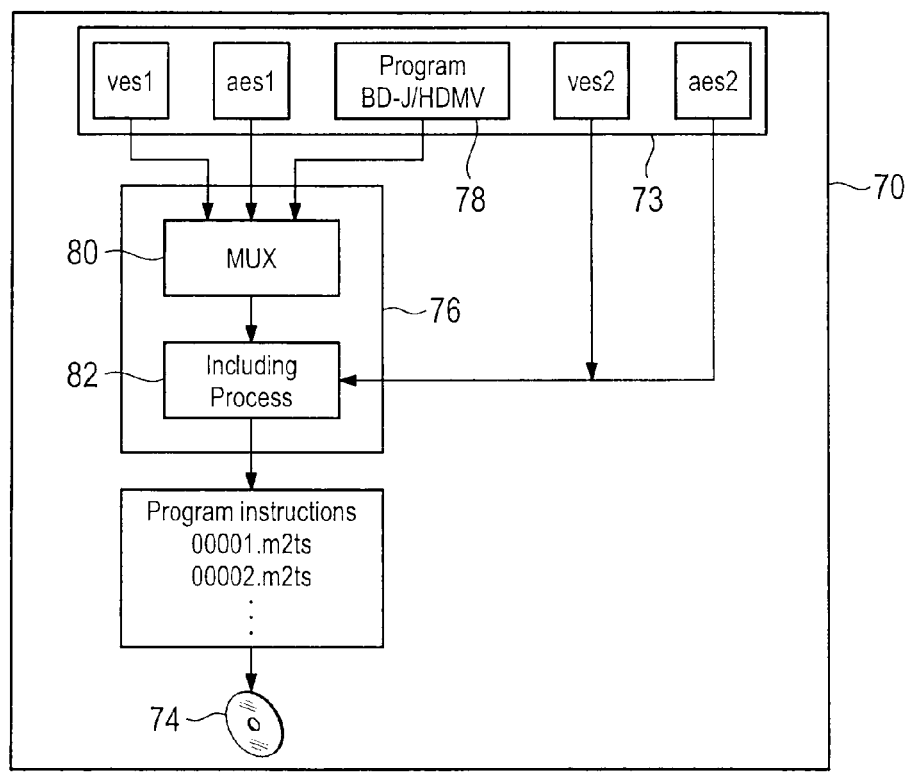
FIG. 11C shows a device for manufacturing a copy protected Blu-ray disc.

FIG. 11C shows another embodiment. In this embodiment, a device 70 is adapted to manufacture a copy protected record carrier. Device 70 includes a receiving unit 73 adapted to receive audiovisual data or audio data to be stored in a plurality of sectors of a record carrier 74, the record carrier 74 having a file system, the receiving unit being further adapted to receive additional or modified audiovisual data or additional or modified audio data to be stored in a plurality of further sectors of the record carrier.

In the exemplary embodiment of FIG. 11C, the visual data are received at ves1 and audio data are received at aes1. Further, additional or modified visual data are received at ves2 and additional or modified audio data are received at aes2.

Device 70 further includes a data processor 76 adapted to generate a first file 00001.m2ts of the file system to be stored on the record carrier 74, the first file 00001.m2ts referencing at least a part of the plurality of sectors and none of the further sectors, such that when the first file 00001.m2ts is rendered by a playback device for the record carrier 74, the audiovisual data or audio data is reproduced which is included in the part of the plurality of sectors.

The data processor 76 is further adapted to generate a plurality of second files 00002.m2ts of the file system to be stored on the record carrier 74, the second files 00002.m2ts being other files than the first file 00001.m2ts and referencing at least a part of the plurality of sectors and further referencing at least one of the plurality of further sectors, such that when the second file 00001.m2ts is rendered by the playback device the part of the plurality of sectors and the at least one of the plurality of further sectors are reproduced.

The data processor is further adapted to receive program instructions (received by unit 78) to be stored on the record carrier 74, which program instructions, when executed by the playback device, extract characteristic parameters of the record carrier, wherein based on the characteristic parameters the first file 00001.m2ts is discriminated from the plurality of second files 00002.m2ts.

For generating the first file 00001.m2ts and the plurality of second files 00002.m2ts ("fake files"), data processor 76 performs a MUX process, as indicated at 80, based on the visual data received at ves1, audio data are received at aes1 and program instructions (e.g. BD-J or HDMV). After the MUX process (being part of a so-called "authoring process"), the data processor 76 performs an including process as indicated at 82. In the including process the additional or modified visual data received at ves2 and additional or modified audio data received at aes2 are included in the plurality of second files 00002.m2ts ("fake files") which are then recorded on disc 74.

As seen in FIG. 11C, the generation/including of fake files may be performed after the MUX process. This can be an advantage since the inclusion of the files after an authoring process is possible. Hence, an authoring process may be performed separately from implementing a copy protection mechanism as described throughout this specification. This can be an advantage since often authoring is done at different sites or different companies than the adding of copy protection which may be done at the site where the optical record carriers are manufactured. Of course it would also be possible to completely separate the copy protection addition from the authoring and manufacturing as well.

Figure 12:
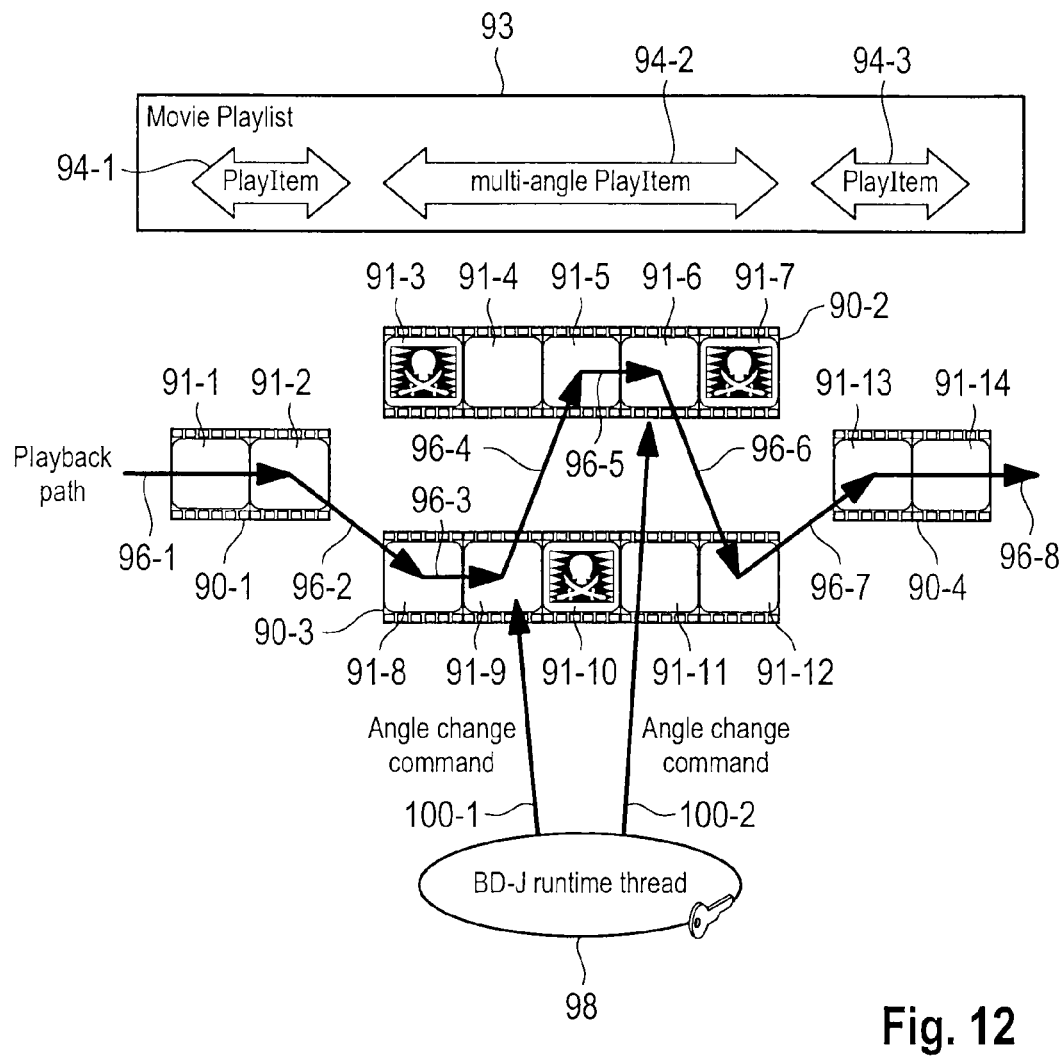
FIG. 12 shows an embodiment where a copy protection is achieved based on a multi-angle play item.

FIG. 12 shows a further embodiment where a copy protection is achieved by means of switching between different files during playback.

On a respectively copy protected record carrier, e.g. a Blu-ray disc, audiovisual data or audio data as well as additional audiovisual data or additional audio data, the additional audiovisual data or additional audio data, e.g. comprising advertisement and the like, i.e. non-genuine content, are stored in one or more files. In the embodiment shown in FIG. 12, data is e.g. stored in files 90-1, 90-2, 90-3 and 90-4.

Each of the files 90-1, . . . , 90-4 include one or more video sequences 91-1, . . . , 91-14.

The files 90-1, . . . , 90-4 are referenced in play items 94-1, 94-2, and 94-3 included in a movie playlist 93. Play item 94-1 references file 90-1. Further, play item 94-2 is a multi-angle play item and references file 90-2 (as a first file) and file 90-3 (as a second file). Still further, play item 94-3 references file 90-4.

Files 90-1 and 90-4 include video clips 91-1, 91-2, 91-13 and 91-14 which all, when reproduced, render original (genuine) content in genuine quality.

On the other hand, as indicated by signs as used above, video sequences 91-3, 91-7 included in file 90-2 as well as video sequence 91-10 included in file 90-3 include additional or modified audiovisual data or additional or modified audio data. As explained above, such content has a reduced entertainment value since it e.g. includes advertisements (in audio, in video or in both), video artifacts, audio artifacts, copyright infringement warnings, information how to purchase a legitimate copy, exchanged audio streams and the like.

The copy protected record carrier further includes a BD-J runtime thread 98 which extracts key material from the disc as explained above or receives respective key material from another BD-J component. The key material is used to control the BD-J runtime thread 98. Based on control instructions, the BD-J runtime thread 98 allows switching between the two files 90-2 and 90-3 included in multi-angle play item 94-2.

In the example of FIG. 12, it is assumed that an original disc is played back and, hence, control of playback by the BD-J runtime thread 98 is such that reproduction of the video sequences 91-3, 91-7 and 91-10 is avoided.

The playback path is indicated by arrows 96-1, . . . , 96-8. As indicated by arrows 100-1 and 100-2, during playback, rendering of the video sequences is switched from the first file 90-2 to the second file 90-3 and back, such that video sequences 91-1, 91-2, 91-8, 91-9, 91-5, 91-6, 91-12, 91-13 and 91-14 are reproduced consecutively. Thereby the original (genuine) content is reproduced. Due to the switching, the video sequences 91-3, 91-7 and 91-10 are not reproduced.

The switching between the first file 90-2 and the second file 90-3 included in multi-angle play item 94-2 may be controlled by setting respective angle registers of a playback device by the BD-J runtime thread 98 or calling a BD-J method which effects an angle change.

The BD-J runtime thread 98 may be a piece of software (program instructions) which is part of the BD-J application stored on the Blu-ray disc. It may be started when the playback device of the copy protected movie begins. The BD-J runtime thread 98 may be active during the whole period of playback time. A purpose of the BD-J runtime thread 98 may be to control the player thread. Basically, the BD-J runtime thread 98 knows where the AV stream is modified to deliberately reduce the entertainment value. The BD-J runtime thread 98, thus, instructs the player when to change the angle, i.e. when to switch between the first file and second file included in the multi-angle play item 94-2. Therefore, the BD-J runtime thread 98 knows the actual playback position. It can e.g. get the actual playback position by querying the player (polling) and/or by receiving events from the player.

Regarding the embodiment shown in FIG. 12 it should be noted that it is also possible that the multi-angle play item 94-2 includes more than two files such as files 90-2 and 90-3 including non-genuine content. In other words, the multi-angle play item 94-2 would then include more than two angles.

Regarding the embodiment shown in FIG. 12 it should further be noted that this method for copy protection is independent from the embodiments shown in FIGS. 1 to 11 in that it is not necessary that Extents included in the files 90-1, 90-2, 90-3, and 90-4 reference (partly) the same sectors of the disc (such as e.g. Extents $Ext0_0$ and $Ext0_1$ in FIG. 2D). On the other hand, as will be explained by means of FIG. 15 further below, a combination is nevertheless possible and beneficial.

The embodiment of FIG. 12 has the advantage that the BD-J runtime thread "owns" the knowledge which is required for the correct playback of a disc. Therefore, in case a copier tries to make a copy of an original disc, he cannot easily remove the BD-J runtime thread 98 since by doing so the information how to control the playback path such as to avoid rendering non-genuine content would be lost.

Moreover, there is no single piece of information which can be easily found out by using a debug tool (debug player).

In case a copier cannot find out the correct playback path, i.e. the correct switching sequence switching between reproduction of different files included in a multi-angle play item at appropriate positions, this will always lead to reproduction of non-genuine content (this is under the assumption that all files included in a multi-angle play item include respective non-genuine content/video sequences such as e.g. video sequences 91-3, 91-7, and 91-10 shown in FIG. 12).

FIG. 13 shows the same example of FIG. 12 and explains how the copy protection works in case a hacker has removed the BD-J runtime thread 98 when making the copy. It is assumed that playback is from a copy of an original disc.

Since the hacker has completely removed the BD-J runtime thread 98 shown in FIG. 12 when making the copy a player cannot control the playback path as indicated at 96-1, . . . , 96-8, in FIG. 12. Instead, the playback path indicated at 100-1, . . . , 100-5 shown in FIG. 13 will be used for playback. This is e.g. because the angle register of a player might be set such that always the first file ("default angle") included in a multi-angle play item 94-2 is rendered.

FIG. 14 shows again the example of FIG. 12, wherein it is assumed that a copy is played back. In this case, however, different from the example shown in FIG. 13, the copier has not removed the BD-J runtime thread 98 while making a copy of an original disc. However, since it is a copy, the key material which will extracted by the BD-J runtime thread or it receives from another BD-J component 98 for controlling the switching between the first file 90-3 and second file 90-4 included in multi-angle play item 94-2, is not the same as it would be had it been extracted from an original disc.

Figure 14:
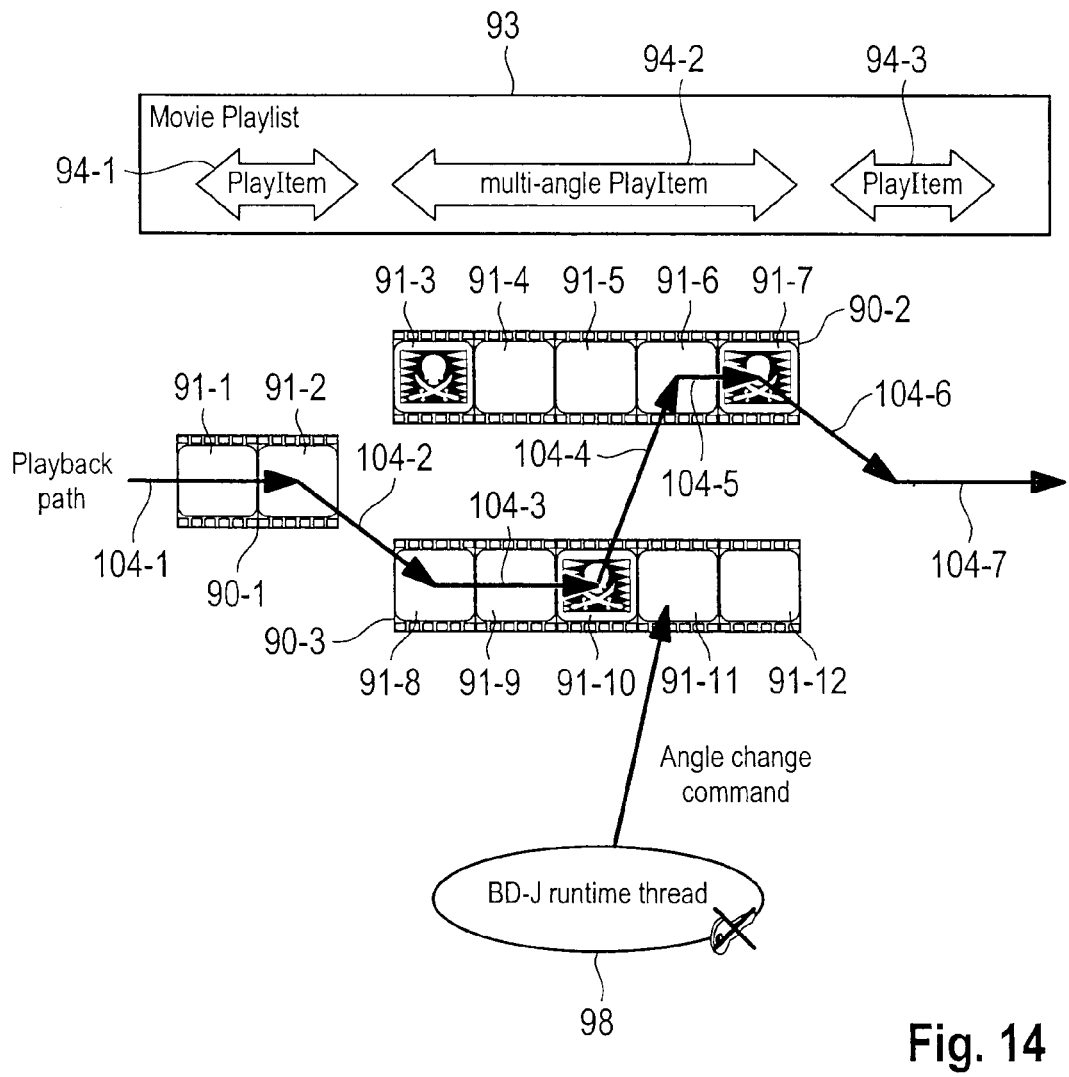
FIG. 14 shows an example of how the copy protection of FIG. 12 works in case playback is from a copy with the BD-J runtime thread being used for playback.

Therefore, the playback path will be different from the playback path shown in FIG. 12. In fact, it may lead to a completely arbitrary switching between the files 90-2 and 90-3 included in the multi-angle play item 94-2. As depicted in FIG. 14, while the (arbitrary) playback path 104-1, . . . , 104-7 is followed, the playback path 104-3 and 104-5 leads to a reproduction of non-genuine content stored in the video sequences 91-10 and 91-7.

As mentioned above, the embodiment shown in FIG. 12 can be implemented independently from the embodiments of FIGS. 1 to 11. In other words, it is not necessary that the Extents included in different files reference (at least partly) the same sectors on a Blu-ray disc. In this case e.g. files 90-2 and 90-3 shown in FIG. 12 would each include Extents referencing entirely different (disjoint) sectors on a disc.

Figure 15:
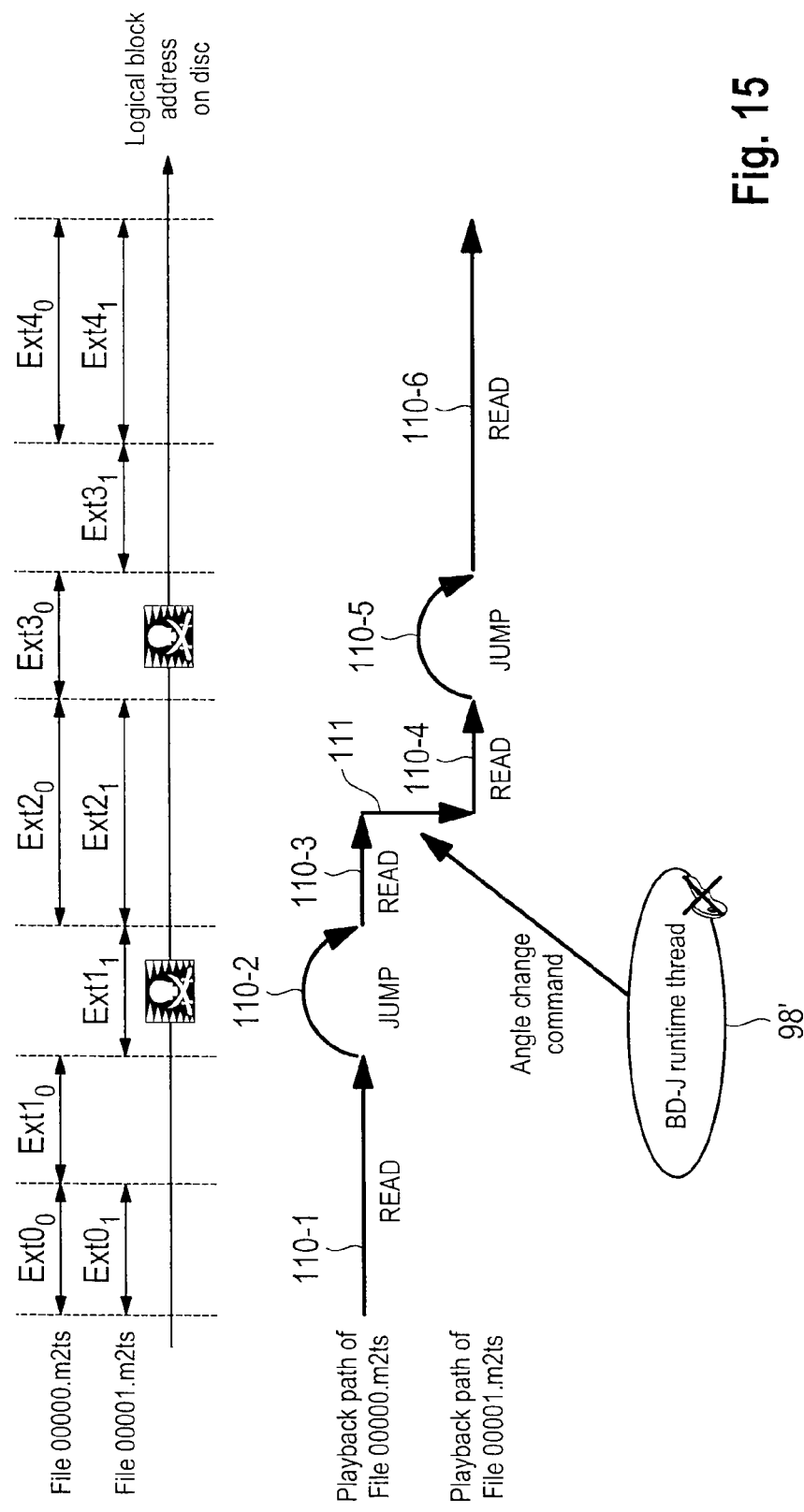
FIG. 15 shows how the concept explained by means of FIG. 12 can be combined with the embodiments of FIGS. 1 to 11.

On the other hand, a combination of the embodiment shown in FIG. 12 with the embodiments in FIGS. 1 to 11 can be beneficial since a large (physical) allocation of storage on the data carrier might be avoided as will become evident by means of FIG. 15.

FIG. 15 shows a first file 00000.m2ts and a second file 00001.m2ts.

The first file 00000.m2ts includes a set of Extents $Ext0_0$, $Ext1_0$, $Ext2_0$, $Ext3_0$, and $Ext4_0$. The second file 00001.m2ts includes a second set of Extents including Extents $Ext0_1$, $Ext1_1$, $Ext2_1$, $Ext3_0$, and $Ext4_1$.

In the example of FIG. 15 it is assumed that Extents $Ext1_1$ and $Ext3_0$ reference sectors ("further sectors") including additional or modified content (non-genuine content).

Depending on the design of the copy protection, $Ext1_1$ could reference sectors ("further sectors") which are a modified copy of sectors referenced by $Ext1_0$. Similarly, the sectors referenced by Extent $Ext3_0$ could be a modified copy of sectors referenced by Extent $Ext3_1$ (cf. the explanation of "modified copy" above).

The first file 00000.m2ts shown in FIG. 15 may correspond to the first file 90-2 of FIG. 12. Further, the second file 00001.m2ts shown in FIG. 15 may correspond to the second file 90-3 shown in FIG. 12.

Thus, in case the concept explained by means of FIGS. 1 to 11 is combined with that of FIG. 12, an advantage may be achieved since it is not necessary that when generating a plurality of files on the Blu-ray disc to be included in a multi-angle play item such as the multi-angle play item 94-2 in FIG. 12, respective data is physically allocated on the disc. This is because data physically stored in sectors on the disc may be referenced by more than one file. Note, for example Extents $Ext0_0$ and $Ext0_1$ respectively included in the first file 00000.m2ts and second file 00001.m2ts reference the same sectors.

Reference signs 110-1, 110-2, 110-3, 110-4, 110-5, and 110-6 illustrate the movement of a reading head of a playback device when rendering the content stored on an original disc. The playback is controlled by a BD-J runtime thread 98'. As seen, in the beginning of the playback process, the first file 0000.m2ts is rendered, wherein the data stored in the sectors referenced by Extents $Ext0_0$, $Ext1_0$ and $Ext2_0$ (only partly) is rendered. Since Extents $Ext1_0$ and $Ext2_0$ are not referencing adjacent sectors, the reading head jumps as indicated at 110-2 (see also e.g. FIG. 2D).

At 111 the BD-J runtime thread 98' switches playback from the first file 00000.m2ts to the second file 00001.m2ts. As explained above, this may be done by e.g. changing an angle register assuming that the first file 00000.m2ts and second file 00001.m2ts are included in a multi-angle play item such as e.g. the multi-angle play item 94-2 in FIG. 12.

After playback has been changed from the first file 00000.m2ts to the second file 00001.m2ts, the rendering of the second file 00001.m2ts continues as indicated at 110-4, 110-5, 110-6. Again, note that the jump at 110-5 avoids that the sectors referenced by Extent $Ext3_0$ included in the first file are rendered. The respective sectors are not referenced by the Extents included in the second set of Extents included in the second file 00001.m2ts.

Figure 16:
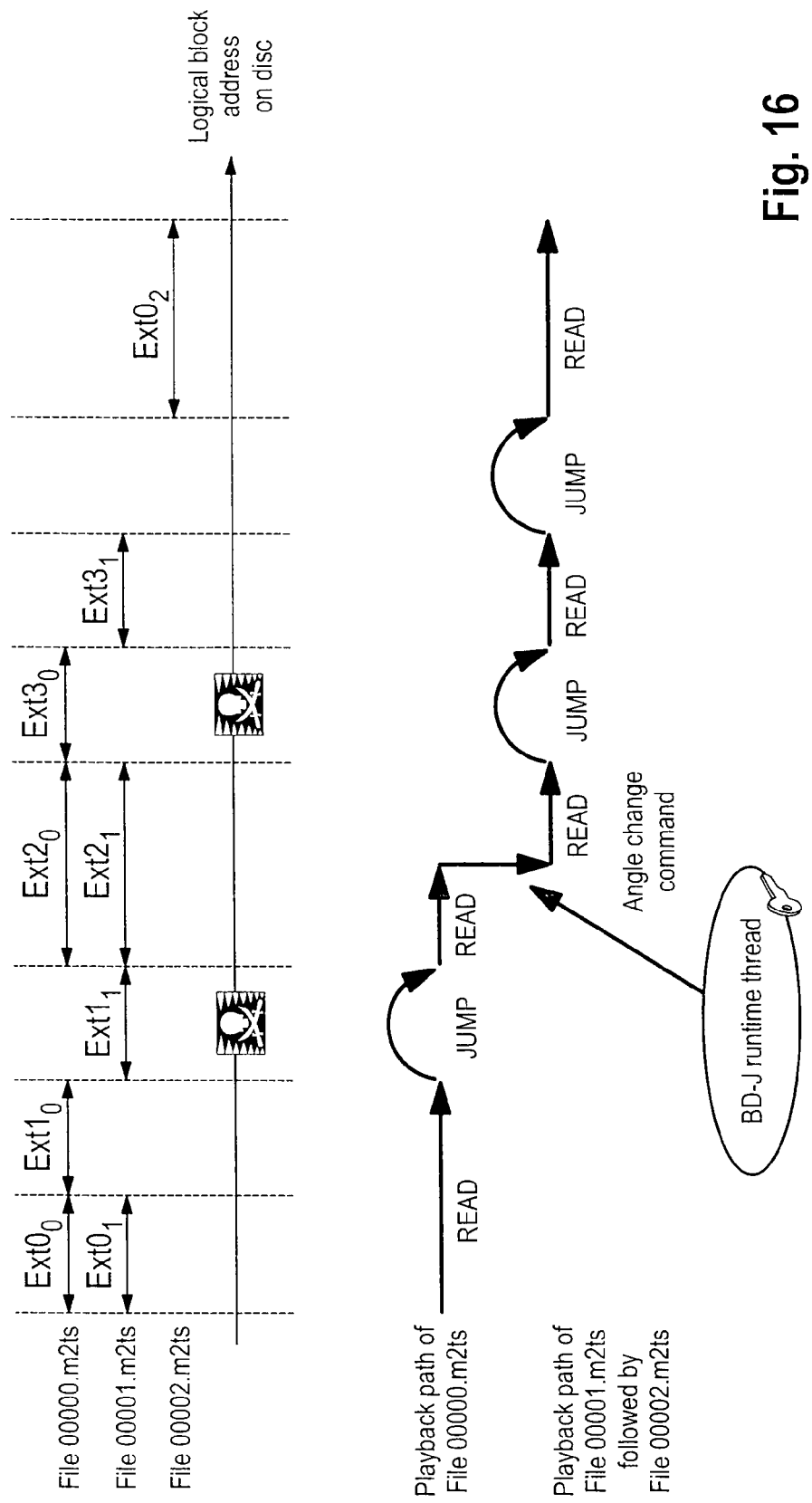
FIG. 16 shows a further embodiment based on FIG. 15.

FIG. 16 shows a further embodiment wherein the concept explained in FIG. 15 is combined with the embodiment explained by means of FIG. 10.

Similarly as in FIG. 10, additional files such as e.g. file 00002.m2ts may be generated which reference sectors storing genuine content. As explained above in connection with FIG. 10, these could be included in playlists as shown in FIG. 4.

FIG. 17A shows two files 00000.ssif and 00000.m2ts as e.g. found on a 3D Blu-ray disc. In FIG. 17A, B[0] and B[1] correspond to sectors that contain the picture for the left eye (base view). Further, D[0] and D[1] denote sectors that contain the picture for the right eye (dependent view).

As seen, the file 00000.m2ts only references sectors B[0] and B[1] via Extents $Ext0_{0m2ts}$ and $Ext1_{0m2ts}$. Thus, file 00000.m2ts only covers data for the left eye (base view). In case the 3D Blu-ray disc is rendered by a 2D Blu-ray player, only the data of the file 00000.m2ts will be rendered.

On the other hand, file 00000.ssif references all sectors B[0], D[0], B[1] and D[1] via Extent $Ext0_{0ssif}$.

According to the embodiment shown in FIG. 17B, further files in accordance with the 3D standard as explained by means of FIG. 17A may be included on a copy protected disc.

In FIG. 17B file 00001.ssif and the corresponding file 00001.m2ts are such further files.

As depicted, file 00001.ssif references sectors B[0], D[0], B[2], D[2], B[3] and D[3] via Extents $Ext0_{1ssif}$ and $Ext1_{1ssif}$. Further, file 00001.m2ts references sectors B[0], B[2] and B[3] via Extents $Ext0_{1m2ts}$, $Ext1_{1m2ts}$ and $Ext2_{1m2ts}$.

As depicted by the same signs used above, in the example of FIG. 17B it is assumed that sectors B[2] and D[2] include non-genuine content. Therefore, in case any of the files 00001.m2ts and 00001.ssif is rendered, non-genuine content will be reproduced. In order to render the original content, it is necessary to render files 00000.m2ts and the corresponding .ssif-file 00000.ssif.

Thus, a copy protection of a 3D Blu-ray disc may be achieved by generating respective fake AV clip files (fake files) and fake clip information files as shown in FIG. 4 referred by respective fake movie playlists.

Only in case the correct movie playlist is detected, the original (genuine) 3D content will be rendered in genuine quality.

It should be noted that it is possible that the sectors B[2] and D[2] comprising the non-genuine content could be "modified copies" (cf. above) of other sectors. For example, in FIG. 17B, the sector B[2] could correspond to a modified copy of the sector B[1]. Further the sector D[2] could be a modified copy of the sector of D[1].

Further embodiments are described in the following first itemized list 1-20:

1. A method for copy protection, comprising:
   providing audiovisual data or audio data to be stored in a plurality of sectors of a record carrier, the record carrier having a file system;
   providing additional or modified audiovisual data or additional or modified audio data to be stored in a plurality of further sectors of the record carrier;
   generating a first file of the file system to be stored on the record carrier, the first file referencing at least a part of the plurality of sectors and none of the further sectors, such that when the first file is rendered by a playback device for the record carrier, the audiovisual data or audio data is reproduced which is included in the part of the plurality of sectors;
   generating a second file of the file system to be stored on the record carrier, the second file being another file than the first file and referencing at least a part of the plurality of sectors and further referencing at least one of the plurality of further sectors, such that when the second file is rendered by the playback device the part of the plurality of sectors and the at least one of the plurality of further sectors are reproduced.

2. The method of item 1, further comprising:
   generating further second files, each of the further second files being other files than the first file and the second file, the further second files respectively referencing at least a respective part of the plurality of sectors and further referencing at least a respective one of the plurality of further sectors, such that when a respective further second file is rendered by the playback device the respective part of the plurality of sectors and the respective one of the plurality of further sectors are reproduced.

3. The method of item 2, further comprising:
   determining program instructions to be stored on the record carrier, which program instructions, when executed by the playback device, extract characteristic parameters of the record carrier, wherein based on the characteristic parameters the first file is discriminated from the second and further second files.
4. The method of any of the preceding items, wherein the additional or modified audiovisual data or additional or modified audio data includes any one of advertisement, video artifacts, audio artifacts, copyright information, sales information and exchange audio streams.
5. The method of any of the preceding items, wherein the first file includes first data units, and wherein the second file includes second data units, wherein the first and second data units at least partly reference the same sectors.
6. The method of any of the preceding items, wherein the first file includes a first set of data units referencing at least a part of the plurality of sectors, and wherein the second file includes a second set of data units referencing a part of the plurality of further sectors, wherein at least one data unit of the second set is a modified copy of a respective one data unit of the first set, wherein the modified copy includes modified audiovisual data or audio data of the respective one data unit, wherein a format of the modified audiovisual data or audio data is in conformity with a specification of the format of the audiovisual data or audio data of the respective one data unit.
7. The method of item 6, wherein the record carrier is a Blu-ray disc, the file system is the UDF file system, the first and second files are UDF files, and the data units are extents.
8. The method of any of the preceding items, comprising:
   generating a plurality of further first files of the file system, the further first files referencing respective further parts of the plurality of sectors and none of the further sectors;
   generating a playlist including the first file and the further first files, wherein when the playlist is used for playback by the playback device, the audiovisual data or audio data is reproduced in genuine quality;
   generating at least one further playlist including the second file or at least one of the further second files, such that when one of the further playlists is used for playback by the playback device, at least a part of the additional or modified audiovisual data or additional or modified audio data is reproduced.
9. The method of item 8, further comprising:
   determining program instructions to be stored on the record carrier, which program instructions, when executed by the playback device, extract characteristic parameters of the record carrier, wherein based on the characteristic parameters the playlist is discriminated from the at least one further playlist.
10. The method of item 1, wherein the record carrier is a Blu-ray disc storing 3D content, wherein the second file references further sectors for the left eye or the right eye.
11. A method for reproducing content stored on a copy protected record carrier, the record carrier comprising
   audiovisual data or audio data stored in a plurality of sectors of a record carrier, the record carrier having a file system;
   additional or modified audiovisual data or additional or modified audio data stored in a plurality of further sectors of the record carrier;
   a first file of the file system, the first file referencing at least a part of the plurality of sectors and none of the further sectors, such that when the first file is rendered by a playback device for the record carrier, the audiovisual data or audio data is reproduced which is included in the part of the plurality of sectors;
   a plurality of second files of the file system, the plurality of second files being other files than the first file and referencing at least a part of the plurality of sectors and further referencing at least one of the plurality of further sectors, such that when the second file is rendered by the playback device the part of the plurality of sectors and the at least one of the plurality of further sectors are reproduced
   program instructions which, when executed by the playback device, extract characteristic parameters of the record carrier, wherein based on the characteristic parameters the first file is discriminated from the plurality of second files, the method comprising the steps of:
   executing the program instructions, such as to render the audiovisual data or audio data and/or the additional or modified audiovisual data or additional or modified audio data depending on whether the record carrier is an original or a copy.
12. A device adapted to reproduce content stored on a copy protected record carrier, the record carrier comprising
   audiovisual data or audio data stored in a plurality of sectors of a record carrier, the record carrier having a file system;
   additional or modified audiovisual data or additional or modified audio data stored in a plurality of further sectors of the record carrier;
   a first file of the file system, the first file referencing at least a part of the plurality of sectors and none of the further sectors, such that when the first file is rendered by a playback device for the record carrier, the audiovisual data or audio data is reproduced which is included in the part of the plurality of sectors;
   a plurality of second files of the file system, the plurality of second files being other files than the first file and referencing at least a part of the plurality of sectors and further referencing at least one of the plurality of further sectors, such that when the second file is rendered by the playback device the part of the plurality of sectors and the at least one of the plurality of further sectors are reproduced
   program instructions which, when executed by the playback device, extract characteristic parameters of the record carrier, wherein based on the characteristic parameters the first file is discriminated from the second and further second files, wherein the device comprises a rendering unit adapted to execute the program instructions and to render the audiovisual data or audio data and/or the additional or modified audiovisual data or additional or modified audio data depending on whether the record carrier is an original or a copy.
13. A device adapted to generate an image for manufacturing a copy protected record carrier, comprising:
   a receiving unit adapted to receive audiovisual data or audio data to be stored in a plurality of sectors of a record carrier, the record carrier having a file system, the receiving unit being further adapted to receive additional or modified audiovisual data or additional or modified audio data to be stored in a plurality of further sectors of the record carrier;
   a data processor adapted to generate a first file of the file system to be stored on the record carrier, the first file referencing at least a part of the plurality of sectors and none of the further sectors, such that when the first file is rendered by a playback device for the record carrier, the audiovisual data or audio data is reproduced which is included in the part of the plurality of sectors, the data processor being further adapted to generate a plurality of second files of the file system to be stored on the record carrier, the second files being other files than the first file and referencing at least a part of the plurality of sectors and further referencing at least one of the plurality of further sectors, such that when the second file is rendered by the playback device the part of the plurality of sectors and the at least one of the plurality of further sectors are reproduced, the data processor being further adapted to receive or to generate program instructions to be stored on the record carrier, which program instructions, when executed by the playback device, extract characteristic parameters of the record carrier, wherein based on the characteristic parameters the first file is discriminated from the plurality of second files.

14. A record carrier, comprising:
audiovisual data or audio data stored in a plurality of sectors of the record carrier, the record carrier having a file system;
additional or modified audiovisual data or additional or modified audio data stored in a plurality of further sectors of the record carrier;
a first file of the file system, the first file referencing at least a part of the plurality of sectors and none of the further sectors, such that when the first file is rendered by a playback device for the record carrier, the audiovisual data or audio data is reproduced which is included in the part of the plurality of sectors;
a second file of the file system, the second file being another file than the first file and referencing at least a part of the plurality of sectors and further referencing at least one of the plurality of further sectors, such that when the second file is rendered by the playback device the part of the plurality of sectors and the at least one of the plurality of further sectors are reproduced.

15. The record carrier of item 14, comprising:
further second files, each of the further second files being other files than the first file and the second file, the further second files respectively referencing at least a respective part of the plurality of sectors and further referencing at least a respective one of the plurality of further sectors, such that when a respective further second file is rendered by the playback device the respective part of the plurality of sectors and the respective one of the plurality of further sectors are reproduced.

16. The record carrier of item 15, comprising:
program instructions which, when executed by the playback device, extract characteristic parameters of the record carrier, wherein based on the characteristic parameters the first file is discriminated from the second and further second files.

17. A method for copy protection, comprising:
providing data to be stored in a plurality of sectors of a record carrier, the record carrier having a file system, the data having an original byte order;
generating a first file of the file system to be stored on the record carrier, the first file referencing the plurality of sectors in a first order, wherein when the first file is read by a reading device for the record carrier, the data is read in the original byte order;
generating a second file of the file system to be stored on the record carrier, the second file being another file than the first file and referencing at least a part of the plurality of sectors in a second order, wherein when the second file is read by the reading device for the record carrier, the data is not read in the original byte order.

18. The method for copy protection of item 17, comprising:
providing additional data to be stored in further sectors of the record carrier, wherein the second file references the further sectors such that the reading device will read the further sectors when reading the second file.

19. A record carrier, comprising:
data stored in a plurality of sectors of the record carrier, the record carrier having a file system, the data having an original byte order;
a first file of the file system, the first file referencing the plurality of sectors in a first order, wherein when the first file is read by a reading device for the record carrier, the data is read in the original byte order;
a second file of the file system, the second file being another file than the first file and referencing at least a part of the plurality of sectors in a second order, wherein when the second file is read by the reading device for the record carrier, the data is not read in the original byte order.

20. A device adapted to manufacture a copy protected record carrier, comprising:
a receiving unit adapted to receive data to be stored in a plurality of sectors of a record carrier, the record carrier having a file system, the data having an original byte order;
a data processor adapted to generate a first file of the file system to be stored on the record carrier, the first file referencing the plurality of sectors in a first order, wherein when the first file is read by a reading device for the record carrier, the data is read in the original byte order, the data processor being further adapted to generate a second file of the file system to be stored on the record carrier, the second file being another file than the first file and referencing at least a part of the plurality of sectors in a second order, wherein when the second file is read by the reading device for the record carrier, the data is not read in the original byte order.

Still further embodiments are described in the following second itemized list 1-11:

1. A method for copy protection, comprising:
providing audiovisual data or audio data to be stored in a plurality of sectors of a record carrier, the record carrier having a file system;
providing additional audiovisual data or additional audio data to be stored in a plurality of further sectors of the record carrier;
generating a first file of the file system to be stored on the record carrier, the first file referencing a first part of the plurality of sectors and a further first part of the plurality of further sectors, such that when the first file is completely rendered by a playback device for the record carrier, a respective first part of the audiovisual data or audio data and a respective further first part of the additional audiovisual data or additional audio data is reproduced;
generating a second file of the file system to be stored on the record carrier, the second file referencing a second part of the plurality of sectors and a further second part of the plurality of further sectors, such that when the second file is completely rendered by a playback device for the record carrier, a respective second part of the audiovisual data or audio data and a respective further second part of the additional audiovisual data or additional audio data is reproduced;

determining program instructions to be stored on the record carrier, which when executed by the playback device control the playback device to switch between reading the first file and the second file, wherein, in case the record carrier is an original, the switching is controlled such that only the plurality of sectors are read and none of the further sectors such that none of the additional audiovisual data or additional audio data is reproduced.

2. The method of item 1, wherein the program instructions, when executed by the playback device, extract characteristic parameters of the record carrier, wherein the switching depends on the characteristic parameters.

3. The method of item 1 or 2, comprising:
generating at least one additional file of the file system to be stored on the record carrier, the at least one additional file referencing a respective additional part of the plurality of sectors and a respective further additional part of the plurality of further sectors, such that when the at least one additional file is rendered by a playback device for the record carrier, a respective additional part of the audiovisual data or audio data and a respective further additional part of the additional audiovisual data or additional audio data is reproduced;
wherein the program instructions to be stored on the record carrier, which when executed by the playback device control the playback device to switch between reading the first file, the second file and the at least one additional file, wherein, in case the record carrier is an original, the switching is controlled such that only the plurality of sectors are read and none of the further sectors such that none of the additional audiovisual data or additional audio data is reproduced.

4. The method of item 1 or 2, wherein the record carrier is a Blu-ray disc, the file system is the UDF file system, the first and second files are included in a multi-angle play item, and the switching is done by changing a setting of an angle register or by calling an angle change method of the playback device.

5. The method of item 4, wherein the first file includes a first set of extents and the second file includes a second set of extents, wherein at least one extent included in the first set references one sector of the plurality of sectors and at least one extent included in the second set references said one sector.

6. A record carrier, comprising:
a plurality of sectors storing audiovisual data or audio data, the record carrier having a file system;
a plurality of further sectors storing additional audiovisual data or additional audio data;
a first file of the file system, the first file referencing a first part of the plurality of sectors and a further first part of the plurality of further sectors, such that when the first file is completely rendered by a playback device for the record carrier, a respective first part of the audiovisual data or audio data and a respective further first part of the additional audiovisual data or additional audio data is reproduced;
a second file of the file system, the second file referencing a second part of the plurality of sectors and a further second part of the plurality of further sectors, such that when the second file is completely rendered by a playback device for the record carrier, a respective second part of the audiovisual data or audio data and a respective further second part of the additional audiovisual data or additional audio data is reproduced;
program instructions, which when executed by the playback device control the playback device to switch between reading the first file and the second file, wherein, in case the record carrier is an original, the switching is controlled such that only the plurality of sectors are read and none of the further sectors such that none of the additional audiovisual data or additional audio data is reproduced.

7. A method for reproducing content stored on a copy protected record carrier, the record carrier comprising
a plurality of sectors storing audiovisual data or audio data, the record carrier having a file system;
a plurality of further sectors storing additional audiovisual data or additional audio data;
a first file of the file system, the first file referencing a first part of the plurality of sectors and a further first part of the plurality of further sectors, such that when the first file is completely rendered by a playback device for the record carrier, a respective first part of the audiovisual data or audio data and a respective further first part of the additional audiovisual data or additional audio data is reproduced;
a second file of the file system, the second file referencing a second part of the plurality of sectors and a further second part of the plurality of further sectors, such that when the second file is completely rendered by a playback device for the record carrier, a respective second part of the audiovisual data or audio data and a respective further second part of the additional audiovisual data or additional audio data is reproduced;
program instructions, which when executed by the playback device control the playback device to switch between reading the first file and the second file, wherein, in case the record carrier is an original, the switching is controlled such that only the plurality of sectors are read and none of the further sectors such that none of the additional audiovisual data or additional audio data is reproduced.

8. A device adapted to reproduce content stored on a copy protected record carrier, the record carrier comprising
a plurality of sectors storing audiovisual data or audio data, the record carrier having a file system;
a plurality of further sectors storing additional audiovisual data or additional audio data;
a first file of the file system, the first file referencing a first part of the plurality of sectors and a further first part of the plurality of further sectors, such that when the first file is completely rendered by a playback device for the record carrier, a respective first part of the audiovisual data or audio data and a respective further first part of the additional audiovisual data or additional audio data is reproduced;
a second file of the file system, the second file referencing a second part of the plurality of sectors and a further second part of the plurality of further sectors, such that when the second file is completely rendered by a playback device for the record carrier, a respective second part of the audiovisual data or audio data and a respective further second part of the additional audiovisual data or additional audio data is reproduced;
program instructions, which when executed by the playback device control the playback device to switch between reading the first file and the second file, wherein, in case the record carrier is an original, the switching is controlled such that only the plurality of sectors are read and none of the further sectors such that none of the additional audiovisual data or additional audio data is reproduced.

9. A device adapted to manufacture a copy protected record carrier, comprising:
   a receiving unit adapted to receive audiovisual data or audio data to be stored in a plurality of sectors of a record carrier, the record carrier having a file system, the receiving unit further being adapted to receive additional audiovisual data or additional audio data to be stored in a plurality of further sectors of the record carrier;
   a data processor adapted to generate a first file of the file system to be stored on the record carrier, the first file referencing a first part of the plurality of sectors and a further first part of the plurality of further sectors, such that when the first file is completely rendered by a playback device for the record carrier, a respective first part of the audiovisual data or audio data and a respective further first part of the additional audiovisual data or additional audio data is reproduced, the data processor being further adapted to generate a second file of the file system to be stored on the record carrier, the second file referencing a second part of the plurality of sectors and a further second part of the plurality of further sectors, such that when the second file is completely rendered by a playback device for the record carrier, a respective second part of the audiovisual data or audio data and a respective further second part of the additional audiovisual data or additional audio data is reproduced.

10. The device according to item 9, wherein the receiving unit is further adapted to receive program instructions to be stored on the record carrier, which when executed by the playback device control the playback device to switch between reading the first file and the second file, wherein, in case the record carrier is an original, the switching is controlled such that only the plurality of sectors are read and none of the further sectors such that none of the additional audiovisual data or additional audio data is reproduced.

11. The device according to item 9 or 10, further including a reproduction unit adapted to store the sectors and further sectors, first and second files and program instructions on a record carrier.

The invention claimed is:

1. A method for copy protection, comprising:
   providing audiovisual data or audio data to be stored in a plurality of sectors of a record carrier, the record carrier having a file system;
   providing additional or modified audiovisual data or additional or modified audio data to be stored in a plurality of further sectors of the record carrier;
   generating a first file of the file system to be stored on the record carrier, the first file referencing at least a part of the plurality of sectors and none of the further sectors, such that when the first file is rendered by a playback device for the record carrier, the audiovisual data or audio data is reproduced which is included in the part of the plurality of sectors;
   generating a second file of the file system to be stored on the record carrier, the second file being another file than the first file and referencing at least a part of the plurality of sectors and further referencing at least one of the plurality of further sectors, such that when the second file is rendered by the playback device the part of the plurality of sectors and the at least one of the plurality of further sectors are reproduced.

2. The method of claim 1, further comprising:
   generating further second files, each of the further second files being other files than the first file and the second file, the further second files respectively referencing at least a respective part of the plurality of sectors and further referencing at least a respective one of the plurality of further sectors, such that when a respective further second file is rendered by the playback device the respective part of the plurality of sectors and the respective one of the plurality of further sectors are reproduced.

3. The method of claim 2, further comprising:
   determining program instructions to be stored on the record carrier, which program instructions, when executed by the playback device, extract characteristic parameters of the record carrier, wherein based on the characteristic parameters the first file is discriminated from the second and further second files.

4. The method of claim 1, wherein the additional or modified audiovisual data or additional or modified audio data includes any one of advertisement, video artifacts, audio artifacts, copyright information, sales information and exchange audio streams.

5. The method of claim 1, wherein the first file includes first data units, and wherein the second file includes second data units, wherein the first and second data units at least partly reference the same sectors.

6. The method of claim 1, wherein the first file includes a first set of data units referencing at least a part of the plurality of sectors, and wherein the second file includes a second set of data units referencing a part of the plurality of further sectors, wherein at least one data unit of the second set is a modified copy of a respective one data unit of the first set, wherein the modified copy includes modified audiovisual data or audio data of the respective one data unit, wherein a format of the modified audiovisual data or audio data is in conformity with a specification of the format of the audiovisual data or audio data of the respective one data unit.

7. The method of claim 6, wherein the record carrier is a Blu-ray disc, the file system is the UDF file system, the first and second files are UDF files, and the data units are extents.

8. The method of claim 1, comprising:
   generating a plurality of further first files of the file system, the further first files referencing respective further parts of the plurality of sectors and none of the further sectors;
   generating a playlist including the first file and the further first files, wherein when the playlist is used for playback by the playback device, the audiovisual data or audio data is reproduced in genuine quality;
   generating at least one further playlist including the second file or at least one of the further second files, such that when one of the further playlists is used for playback by the playback device, at least a part of the additional or modified audiovisual data or additional or modified audio data is reproduced.

9. The method of claim 8, further comprising:
   determining program instructions to be stored on the record carrier, which program instructions, when executed by the playback device, extract characteristic parameters of the record carrier, wherein based on the characteristic parameters the playlist is discriminated from the at least one further playlist.

10. The method of claim 1, wherein the record carrier is a Blu-ray disc storing 3D content, wherein the second file references further sectors for the left eye or the right eye.

11. A method for reproducing content stored on a copy protected record carrier, the record carrier comprising audiovisual data or audio data stored in a plurality of sectors of a record carrier, the record carrier having a file system;

additional or modified audiovisual data or additional or modified audio data stored in a plurality of further sectors of the record carrier;

a first file of the file system, the first file referencing at least a part of the plurality of sectors and none of the further sectors, such that when the first file is rendered by a playback device for the record carrier, the audiovisual data or audio data is reproduced which is included in the part of the plurality of sectors;

a plurality of second files of the file system, the plurality of second files being other files than the first file and referencing at least a part of the plurality of sectors and further referencing at least one of the plurality of further sectors, such that when the second file is rendered by the playback device the part of the plurality of sectors and the at least one of the plurality of further sectors are reproduced program instructions which, when executed by the playback device, extract characteristic parameters of the record carrier, wherein based on the characteristic parameters the first file is discriminated from the plurality of second files, the method comprising the steps of:

executing the program instructions, such as to render the audiovisual data or audio data and/or the additional or modified audiovisual data or additional or modified audio data depending on whether the record carrier is an original or a copy.

12. A device adapted to reproduce content stored on a copy protected record carrier, the record carrier comprising audiovisual data or audio data stored in a plurality of sectors of a record carrier, the record carrier having a file system;

additional or modified audiovisual data or additional or modified audio data stored in a plurality of further sectors of the record carrier;

a first file of the file system, the first file referencing at least a part of the plurality of sectors and none of the further sectors, such that when the first file is rendered by a playback device for the record carrier, the audiovisual data or audio data is reproduced which is included in the part of the plurality of sectors;

a plurality of second files of the file system, the plurality of second files being other files than the first file and referencing at least a part of the plurality of sectors and further referencing at least one of the plurality of further sectors, such that when the second file is rendered by the playback device the part of the plurality of sectors and the at least one of the plurality of further sectors are reproduced program instructions which, when executed by the playback device, extract characteristic parameters of the record carrier, wherein based on the characteristic parameters the first file is discriminated from the second and further second files, wherein the device comprises a rendering unit adapted to execute the program instructions and to render the audiovisual data or audio data and/or the additional or modified audiovisual data or additional or modified audio data depending on whether the record carrier is an original or a copy.

13. A device adapted to generate an image for manufacturing a copy protected record carrier, comprising:

a receiving unit adapted to receive audiovisual data or audio data to be stored in a plurality of sectors of a record carrier, the record carrier having a file system, the receiving unit being further adapted to receive additional or modified audiovisual data or additional or modified audio data to be stored in a plurality of further sectors of the record carrier;

a data processor adapted to generate a first file of the file system to be stored on the record carrier, the first file referencing at least a part of the plurality of sectors and none of the further sectors, such that when the first file is rendered by a playback device for the record carrier, the audiovisual data or audio data is reproduced which is included in the part of the plurality of sectors, the data processor being further adapted to generate a plurality of second files of the file system to be stored on the record carrier, the second files being other files than the first file and referencing at least a part of the plurality of sectors and further referencing at least one of the plurality of further sectors, such that when the second file is rendered by the playback device the part of the plurality of sectors and the at least one of the plurality of further sectors are reproduced, the data processor being further adapted to receive or to generate program instructions to be stored on the record carrier, which program instructions, when executed by the playback device, extract characteristic parameters of the record carrier, wherein based on the characteristic parameters the first file is discriminated from the plurality of second files.

14. A record carrier, comprising:

audiovisual data or audio data stored in a plurality of sectors of the record carrier, the record carrier having a file system;

additional or modified audiovisual data or additional or modified audio data stored in a plurality of further sectors of the record carrier;

a first file of the file system, the first file referencing at least a part of the plurality of sectors and none of the further sectors, such that when the first file is rendered by a playback device for the record carrier, the audiovisual data or audio data is reproduced which is included in the part of the plurality of sectors;

a second file of the file system, the second file being another file than the first file and referencing at least a part of the plurality of sectors and further referencing at least one of the plurality of further sectors, such that when the second file is rendered by the playback device the part of the plurality of sectors and the at least one of the plurality of further sectors are reproduced.

15. The record carrier of claim 14, comprising:

further second files, each of the further second files being other files than the first file and the second file, the further second files respectively referencing at least a respective part of the plurality of sectors and further referencing at least a respective one of the plurality of further sectors, such that when a respective further second file is rendered by the playback device the respective part of the plurality of sectors and the respective one of the plurality of further sectors are reproduced.

16. The record carrier of claim 15, comprising:

program instructions which, when executed by the playback device, extract characteristic parameters of the record carrier, wherein based on the characteristic parameters the first file is discriminated from the second and further second files.

17. A method for copy protection, comprising:

providing data to be stored in a plurality of sectors of a record carrier, the record carrier having a file system, the data having an original byte order;

generating a first file of the file system to be stored on the record carrier, the first file referencing the plurality of sectors in a first order, wherein when the first file is read by a reading device for the record carrier, the data is read in the original byte order;

generating a second file of the file system to be stored on the record carrier, the second file being another file than the first file and referencing at least a part of the plurality of sectors in a second order, wherein when the second file is read by the reading device for the record carrier, the data is not read in the original byte order.

18. The method for copy protection of claim 17, comprising:

providing additional data to be stored in further sectors of the record carrier, wherein the second file references the further sectors such that the reading device will read the further sectors when reading the second file.

19. A record carrier, comprising:

data stored in a plurality of sectors of the record carrier, the record carrier having a file system, the data having an original byte order;

a first file of the file system, the first file referencing the plurality of sectors in a first order, wherein when the first file is read by a reading device for the record carrier, the data is read in the original byte order;

a second file of the file system, the second file being another file than the first file and referencing at least a part of the plurality of sectors in a second order, wherein when the second file is read by the reading device for the record carrier, the data is not read in the original byte order.

20. A device adapted to manufacture a copy protected record carrier, comprising:

a receiving unit adapted to receive data to be stored in a plurality of sectors of a record carrier, the record carrier having a file system, the data having an original byte order;

a data processor adapted to generate a first file of the file system to be stored on the record carrier, the first file referencing the plurality of sectors in a first order, wherein when the first file is read by a reading device for the record carrier, the data is read in the original byte order, the data processor being further adapted to generate a second file of the file system to be stored on the record carrier, the second file being another file than the first file and referencing at least a part of the plurality of sectors in a second order, wherein when the second file is read by the reading device for the record carrier, the data is not read in the original byte order.

* * * * *